United States Patent [19]
Lee et al.

[11] Patent Number: 5,918,446
[45] Date of Patent: Jul. 6, 1999

[54] APPARATUS AND SYSTEMS FOR REORIENTING AND TRANSFERRING ELONGATE ARTICLES, ESPECIALLY FROZEN DESSERT CONES

[75] Inventors: Uk Lee, Ellicott City; Mark L. West, Baltimore, both of Md.; Kenneth H. Bealer, Wilmington, N.C.

[73] Assignee: Sweetheart Cup Co., Inc., Owings Mills, Md.

[21] Appl. No.: 08/889,878

[22] Filed: Jul. 8, 1997

[51] Int. Cl.⁶ .................................................. B65B 35/56
[52] U.S. Cl. ................................................................ 53/544
[58] Field of Search ........................ 198/374; 414/788.2, 414/788.3, 798.4; 53/446, 544

[56] References Cited

U.S. PATENT DOCUMENTS

| | | | |
|---|---|---|---|
| 2,069,926 | 2/1937 | Read | 53/537 X |
| 3,043,070 | 7/1962 | Cammack | 53/544 |
| 3,777,504 | 12/1973 | Marchi . | |
| 3,802,154 | 4/1974 | Dillon | 53/537 X |
| 3,859,772 | 1/1975 | Thierion | 53/537 X |
| 3,878,665 | 4/1975 | Couten | 53/537 X |
| 4,188,768 | 2/1980 | Getman . | |
| 4,192,415 | 3/1980 | Krener et al. . | |
| 4,224,895 | 9/1980 | Launay . | |
| 4,397,130 | 8/1983 | Thierion | 53/247 X |
| 4,402,173 | 9/1983 | Thierion | 53/247 X |
| 4,498,273 | 2/1985 | Colamussi . | |
| 4,514,956 | 5/1985 | Varallo et al. | 53/544 X |
| 4,530,435 | 7/1985 | Stohlquist | 53/544 X |
| 4,555,892 | 12/1985 | Dijkman . | |
| 4,643,905 | 2/1987 | Getman . | |
| 4,684,307 | 8/1987 | Lattion | 198/395 X |
| 4,686,813 | 8/1987 | Sawada . | |
| 4,694,637 | 9/1987 | Bech et al. . | |
| 4,731,977 | 3/1988 | Maekawa . | |
| 4,799,351 | 1/1989 | Blanda . | |
| 4,899,866 | 2/1990 | Colamussi . | |
| 4,901,502 | 2/1990 | Colamussi . | |
| 5,064,666 | 11/1991 | Vos . | |
| 5,102,672 | 4/1992 | Vos . | |
| 5,228,267 | 7/1993 | Blankenship et al. . | |
| 5,257,493 | 11/1993 | Cocchi et al. . | |
| 5,298,273 | 3/1994 | Ito . | |
| 5,379,569 | 1/1995 | Mueller . | |

*Primary Examiner*—Daniel B. Moon
*Attorney, Agent, or Firm*—Nixon & Vanderhye P.C.

[57] ABSTRACT

Systems and methods reorient head-to-head aligned leading and following articles to from an array of alternating head-to-tail oriented articles. The leading and following articles are initially captured at their respective head portions, and thereafter laterally shifted relative to one another. The laterally shifted leading and following articles may then be pivoted so that their respective tail portions swing towards one another to thereby form an array of alternating head-to-tail oriented articles. A moveable transfer tray may be brought into a position below the captured array of head-to-tail oriented articles so that upon their release, the array of a head-to-tail oriented articles falls by gravity and into the awaiting tray therebelow. The tray may then be retracted so as to carry the array of head-to-tail articles to a remote site, preferably above a transfer conveyor. A bottom wall of the transfer tray may then be retracted causing the array of head-to-tail oriented articles to again fall by gravity onto the transfer conveyor. The transfer conveyor may thus transport the array to another location, for example, a packaging station, where a secondary transfer assembly moves the array into an awaiting empty package. Most preferably, the articles are frozen dessert cones.

19 Claims, 30 Drawing Sheets

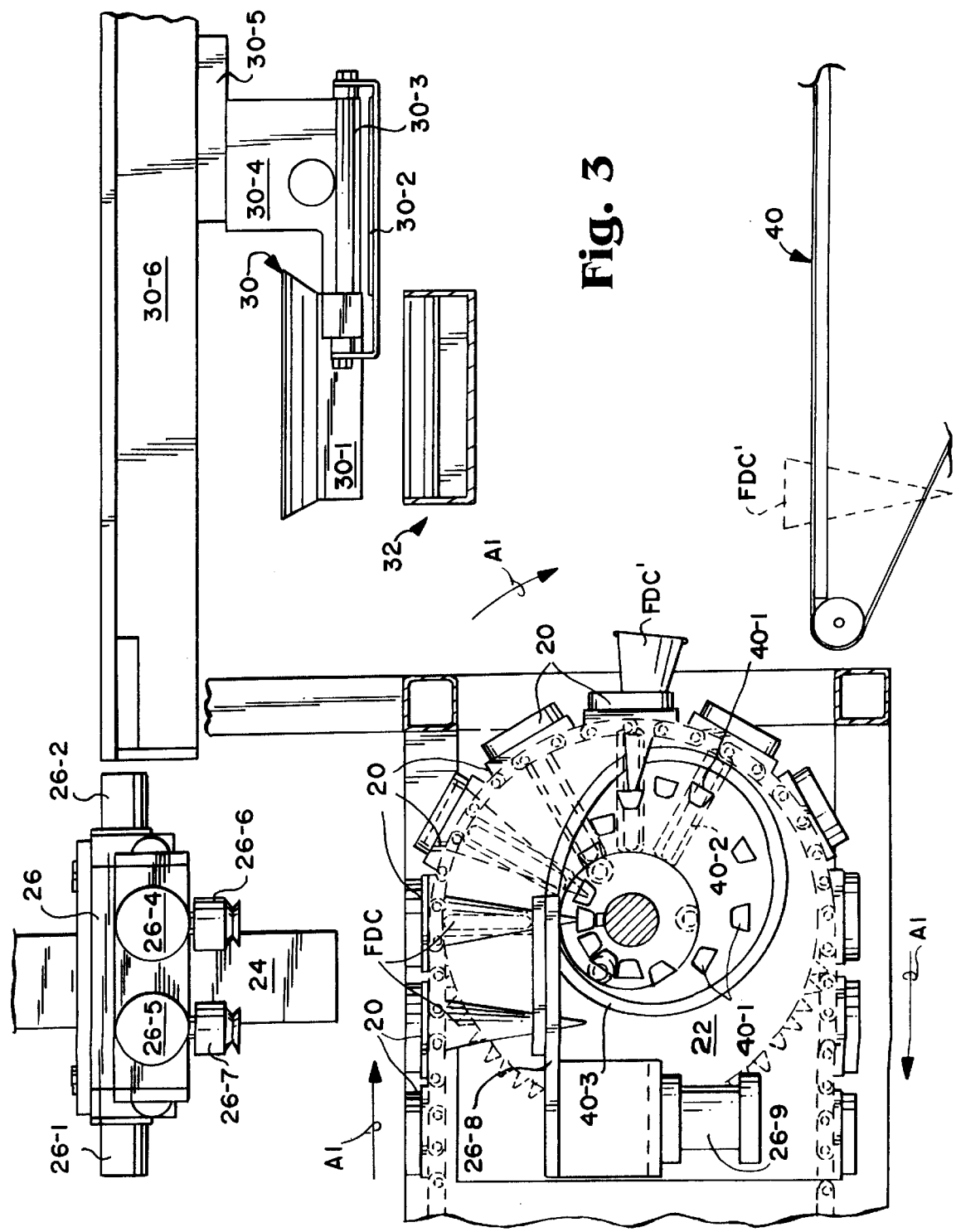

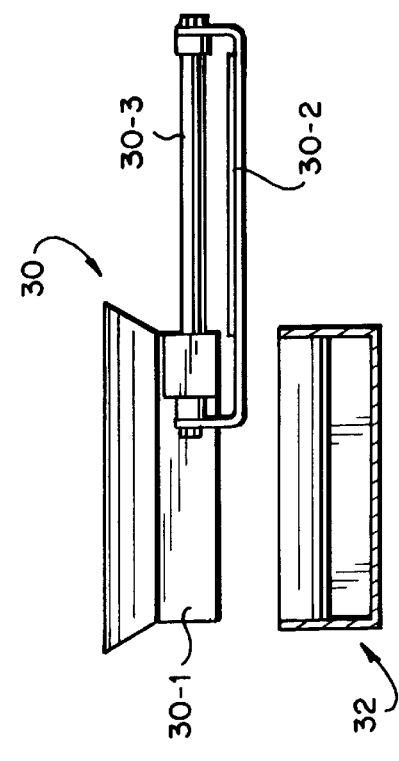
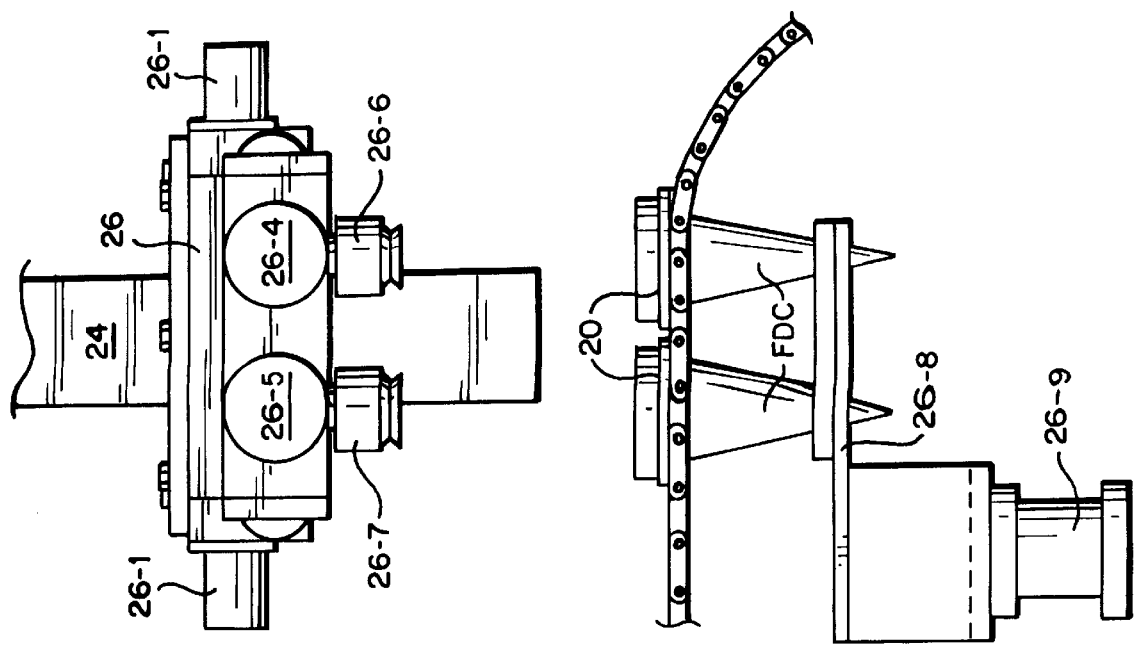
Fig. 9A

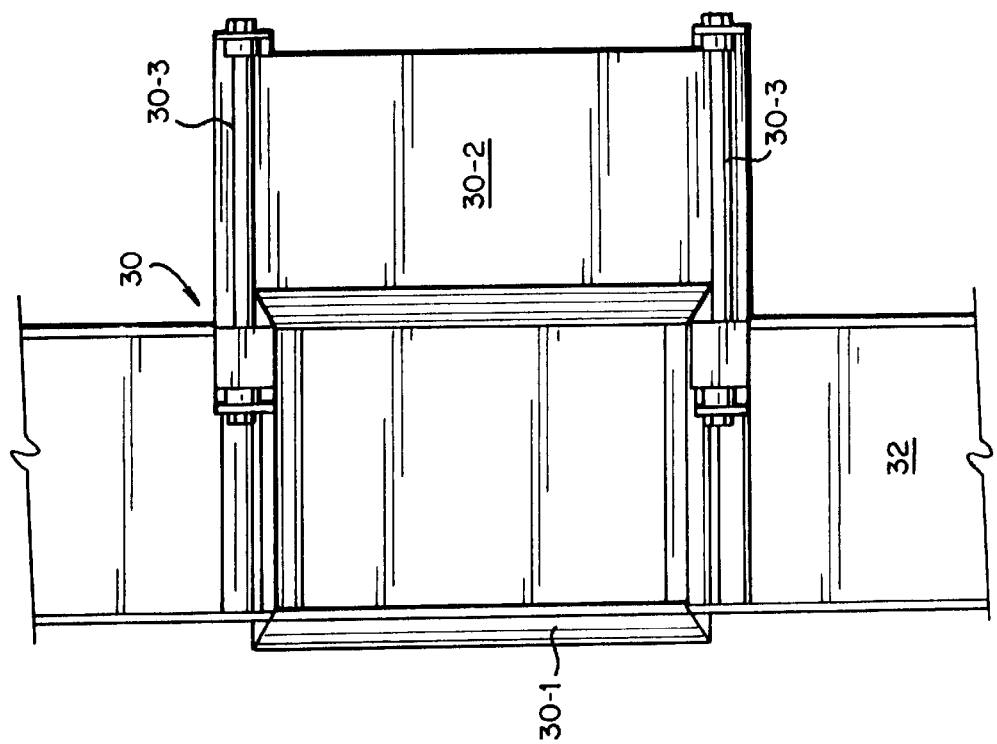
Fig. 9B
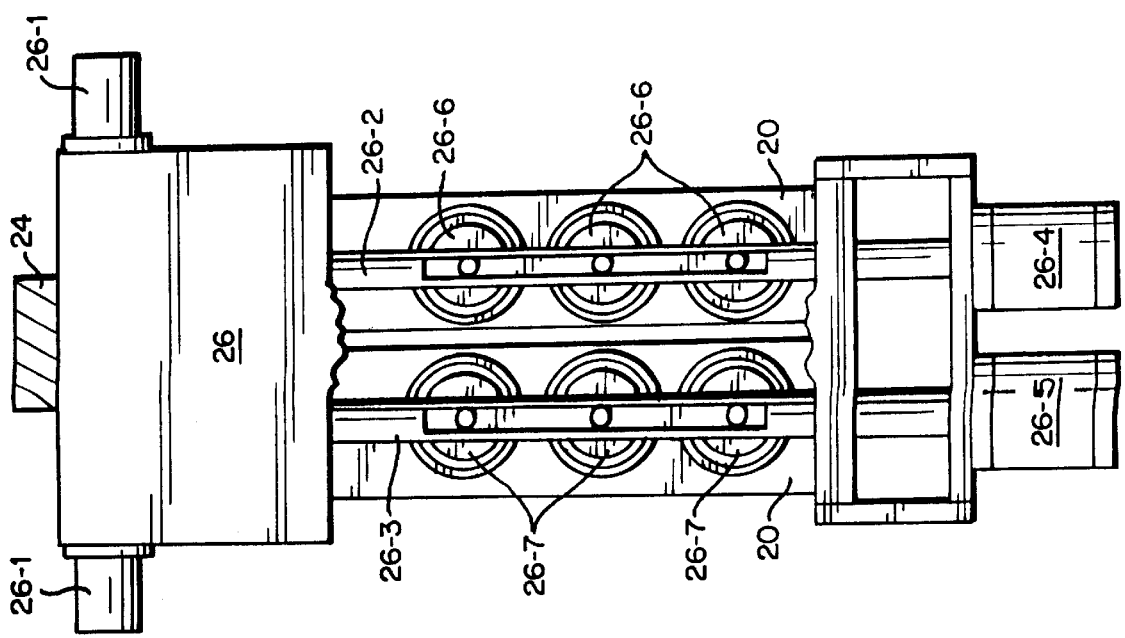

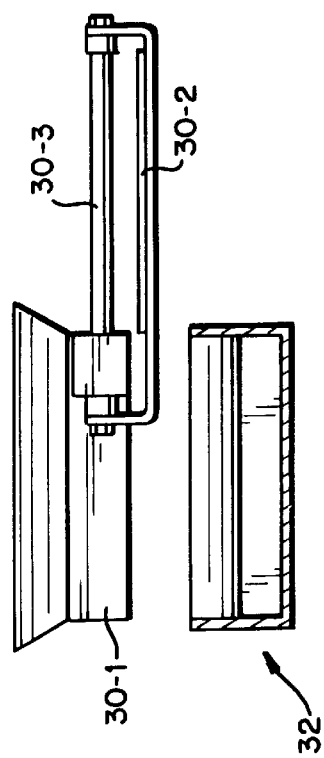
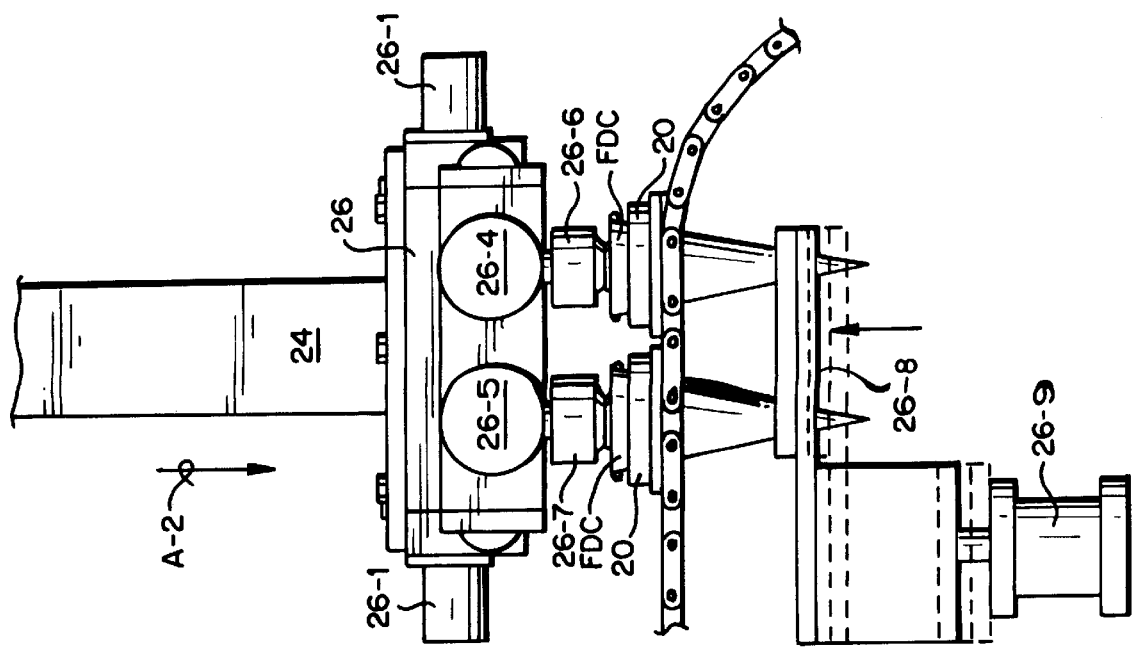
Fig. 10A

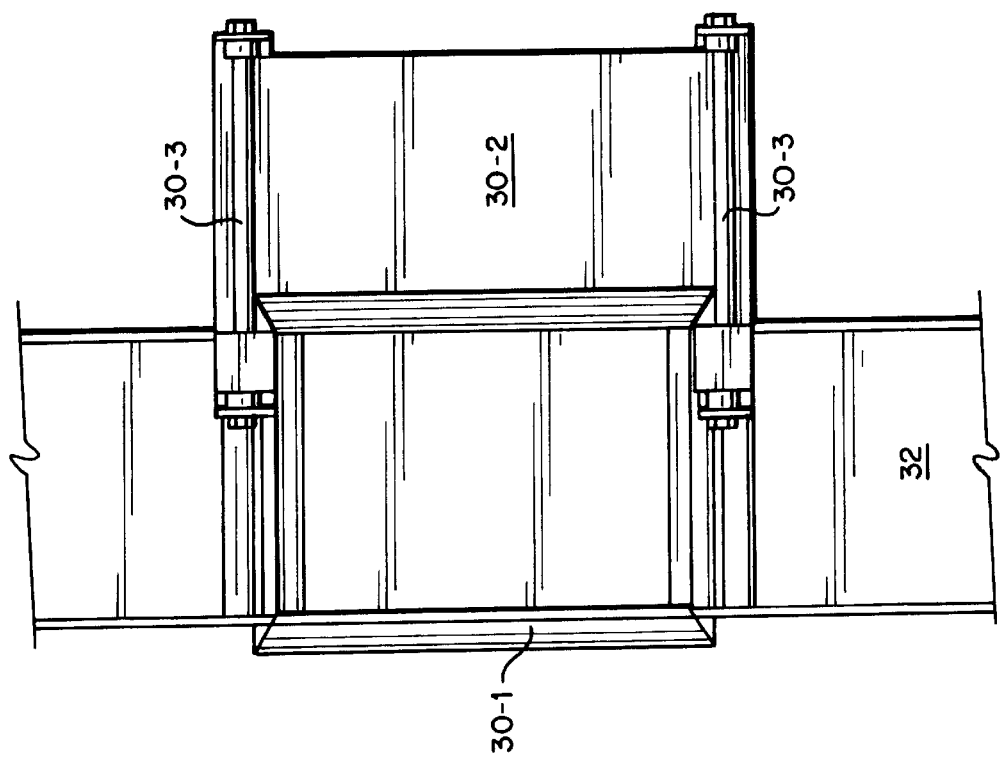
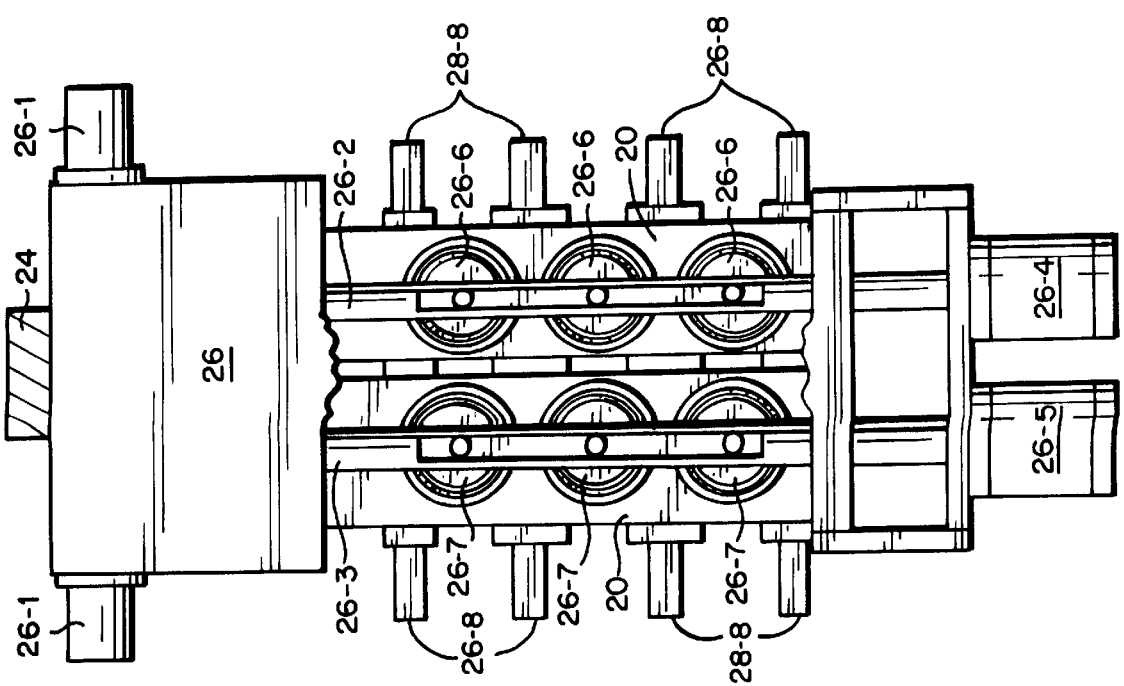
Fig. 10B

Fig. 11A
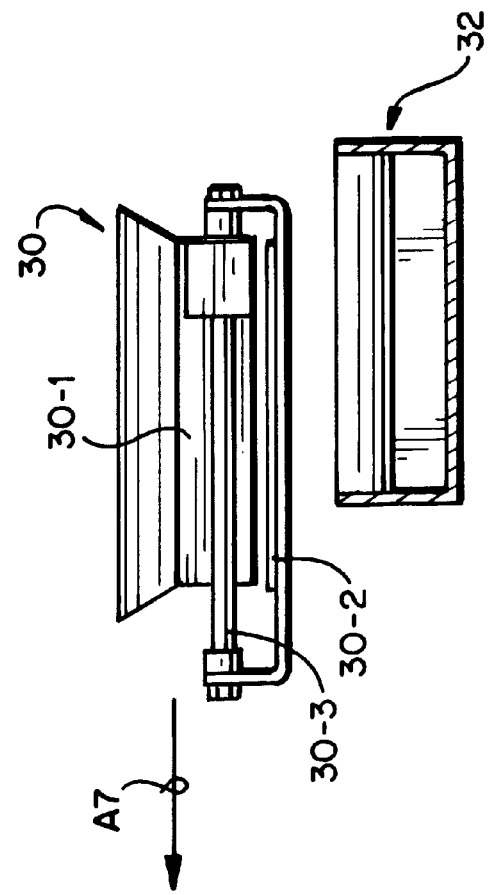
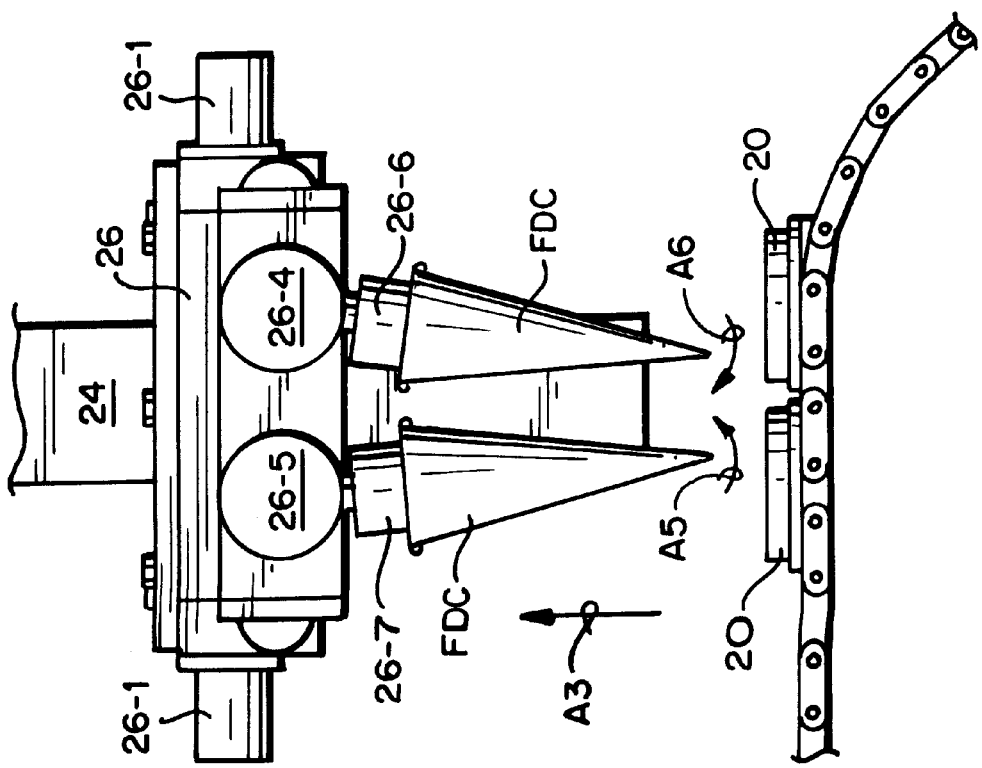

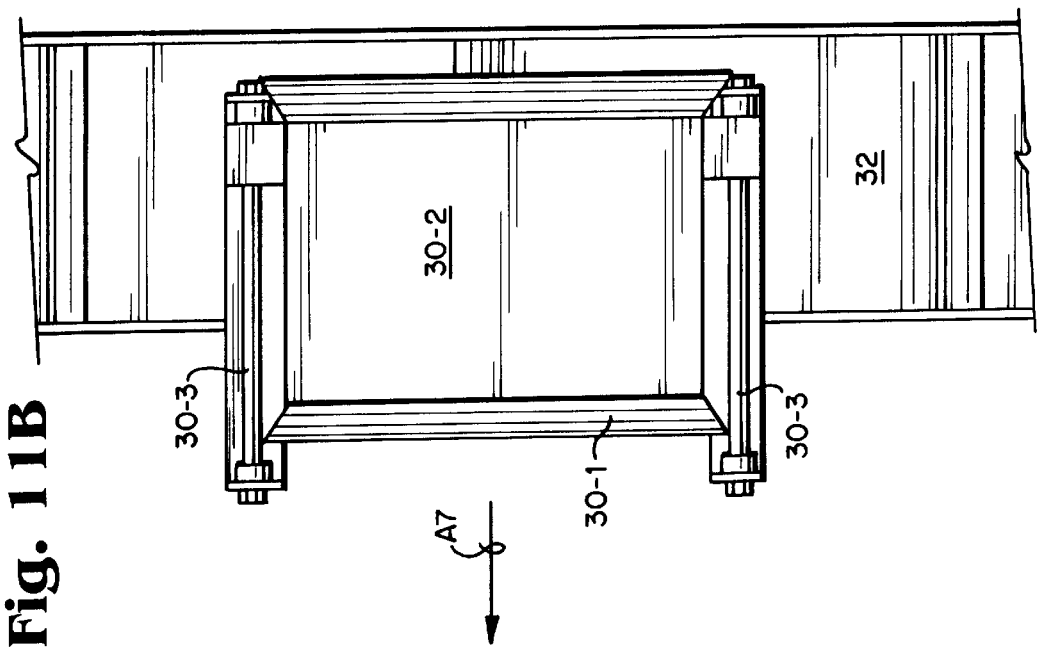
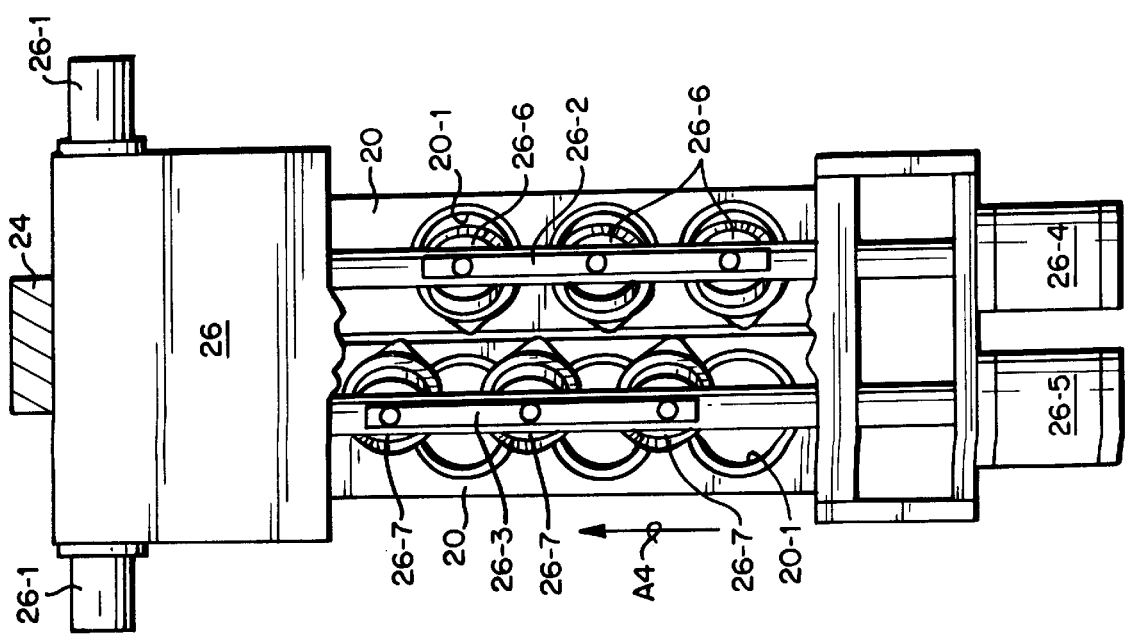
Fig. 11B

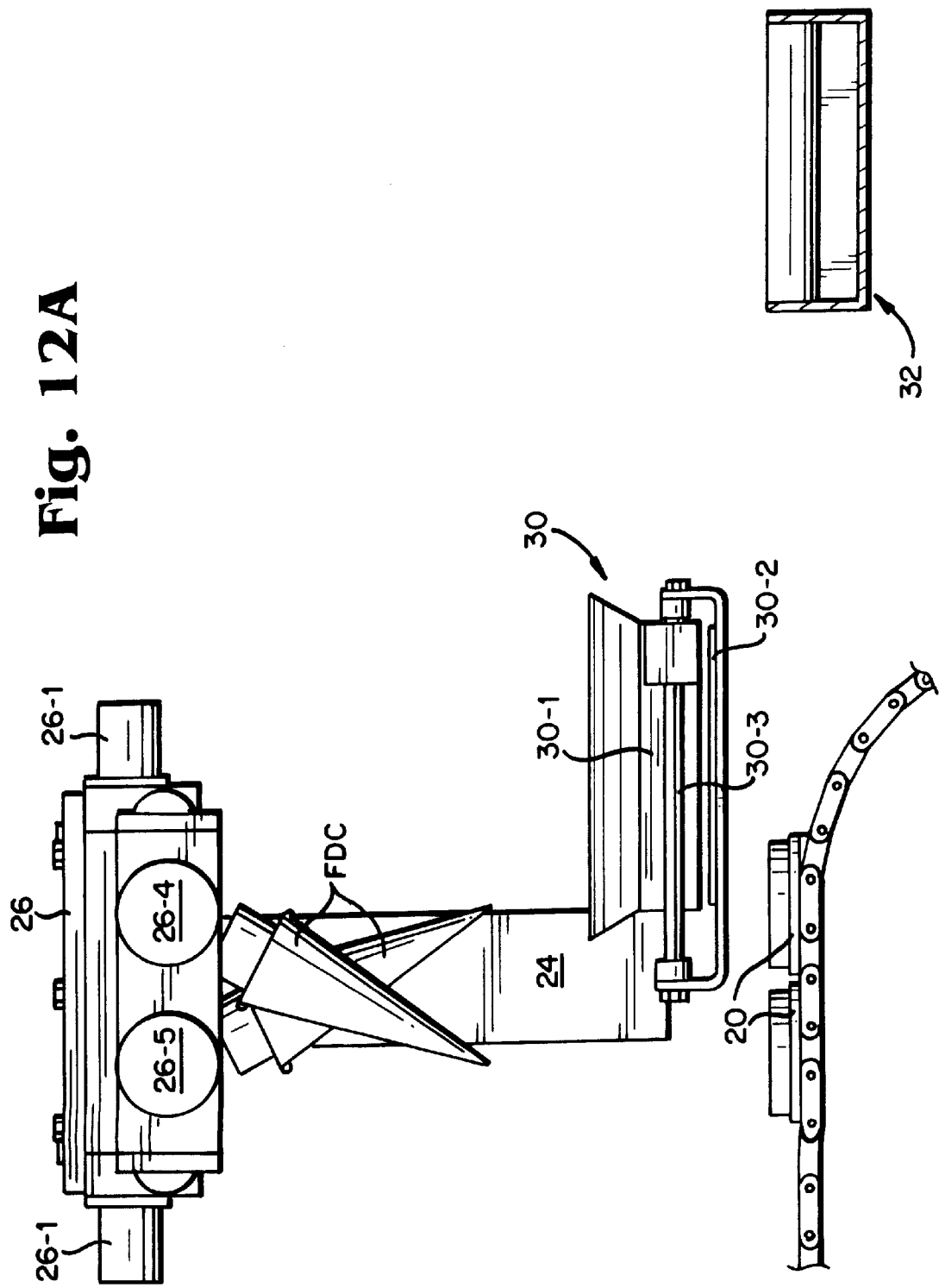

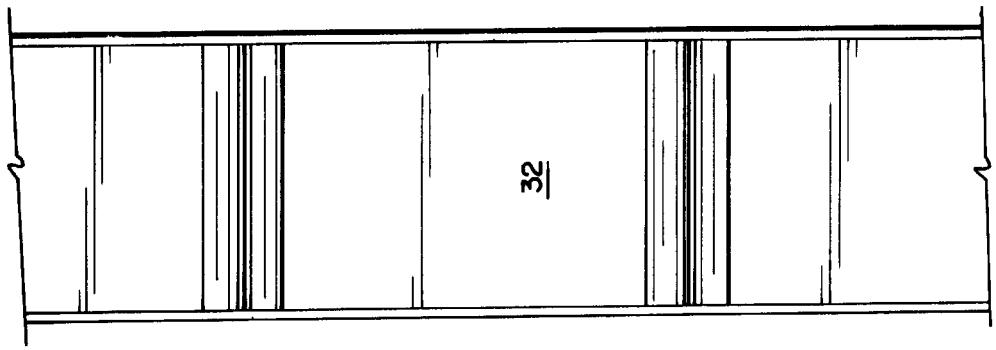
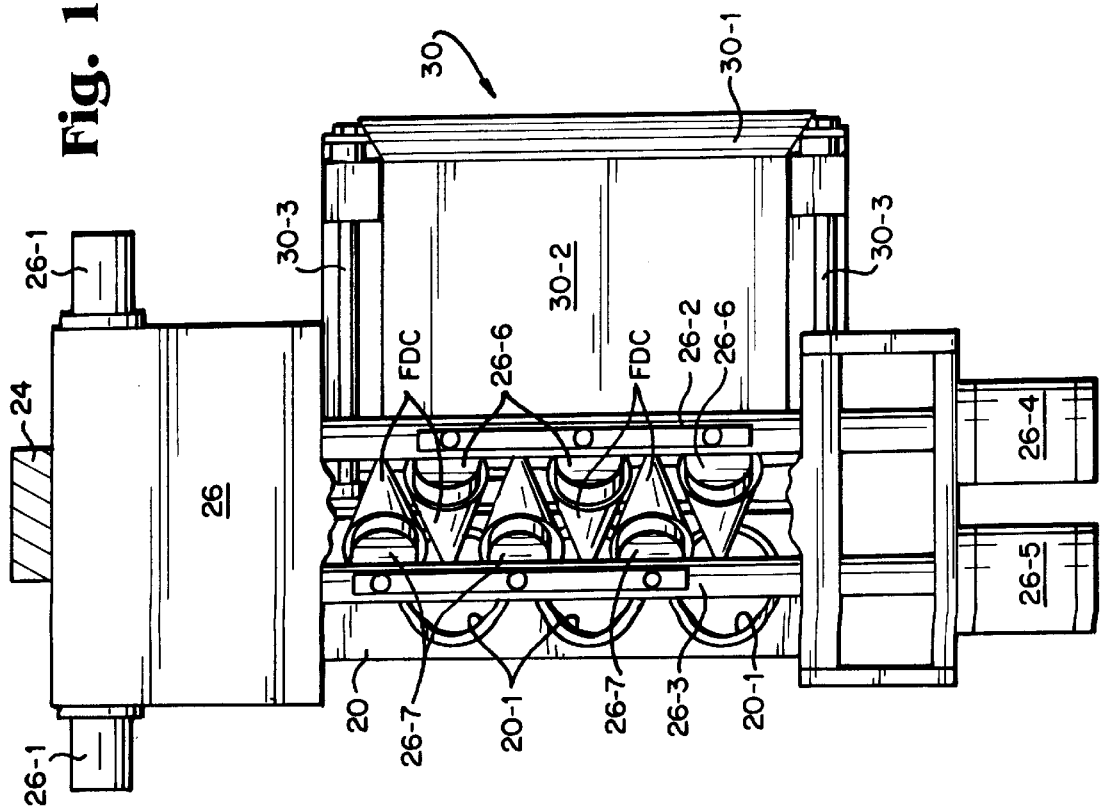
Fig. 12B

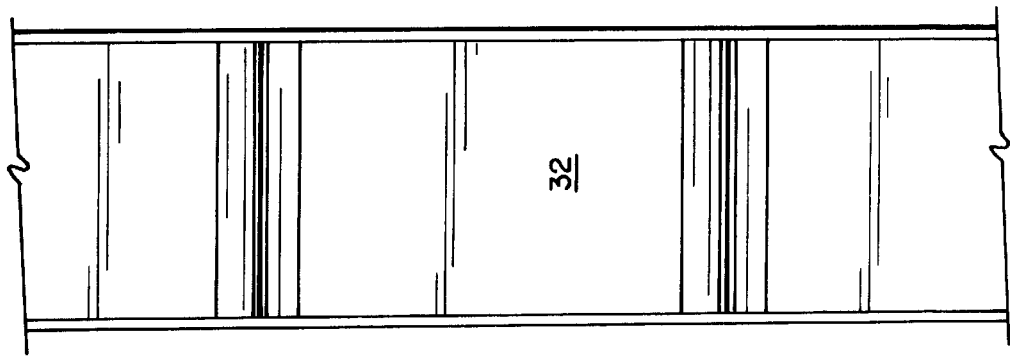
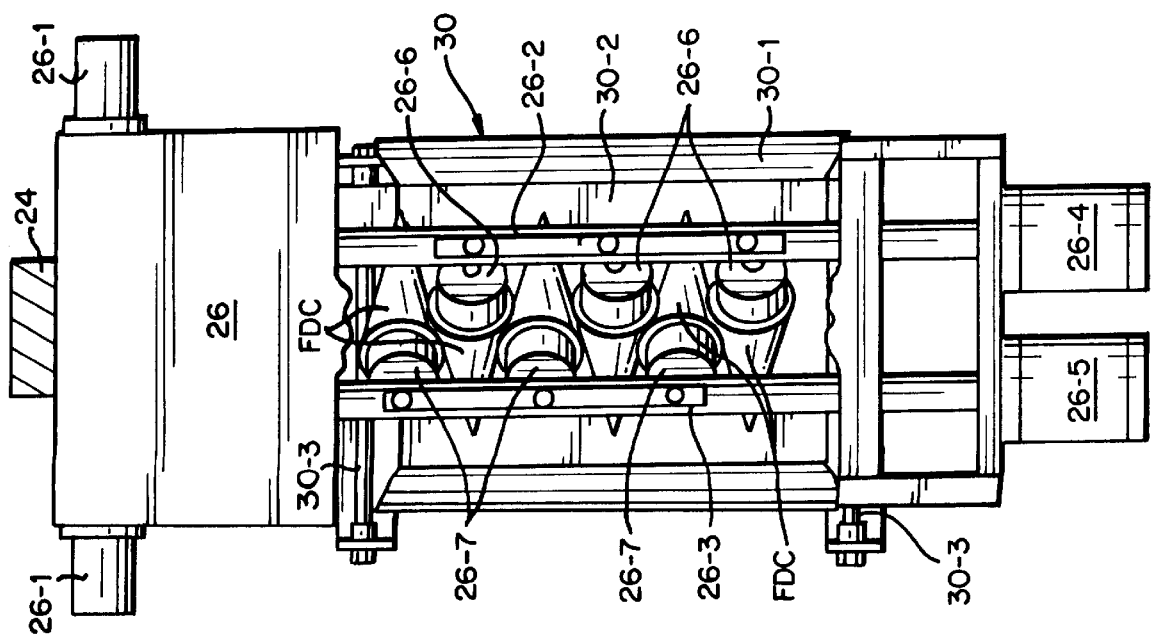
Fig. 13B

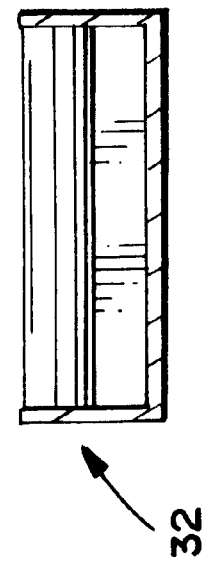
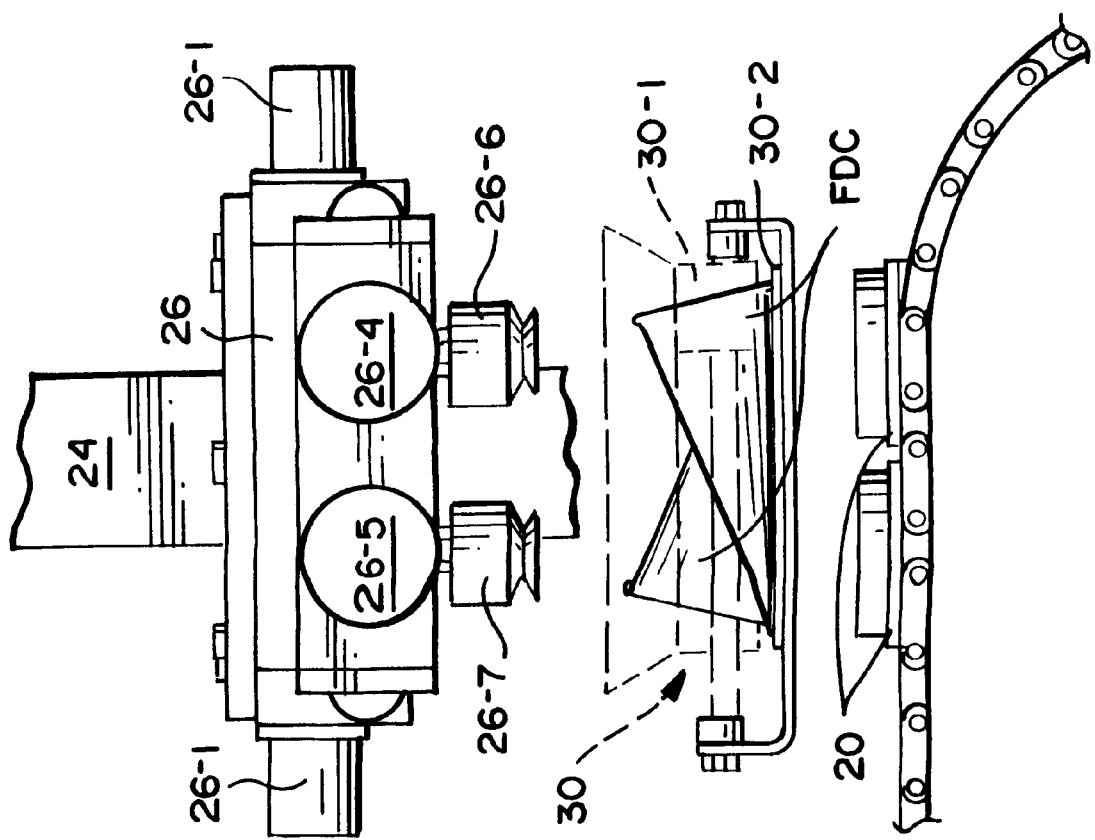
Fig. 14A

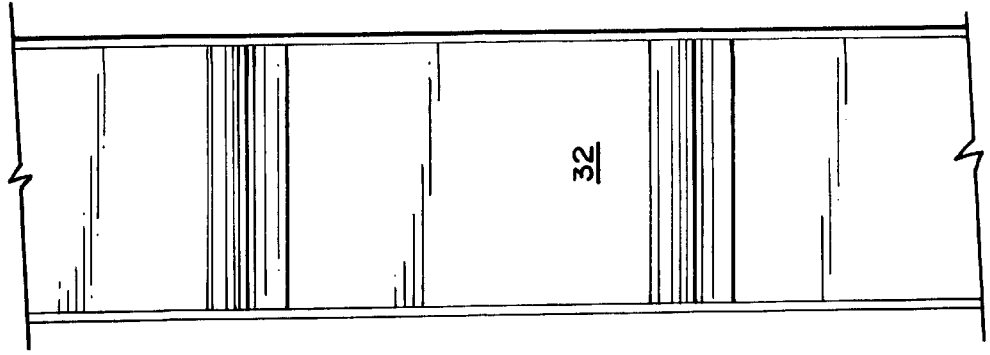
Fig. 14B
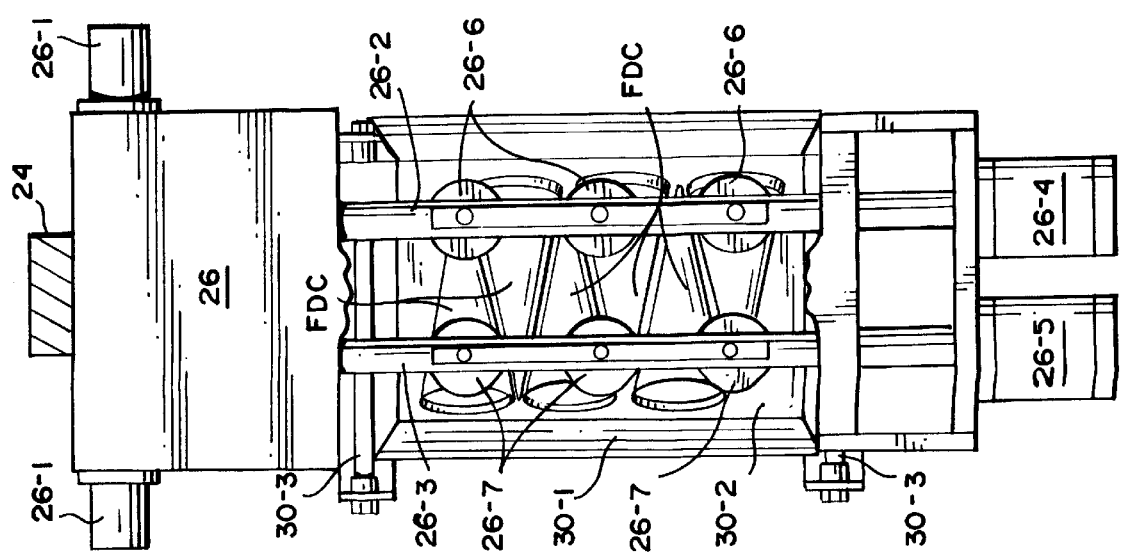

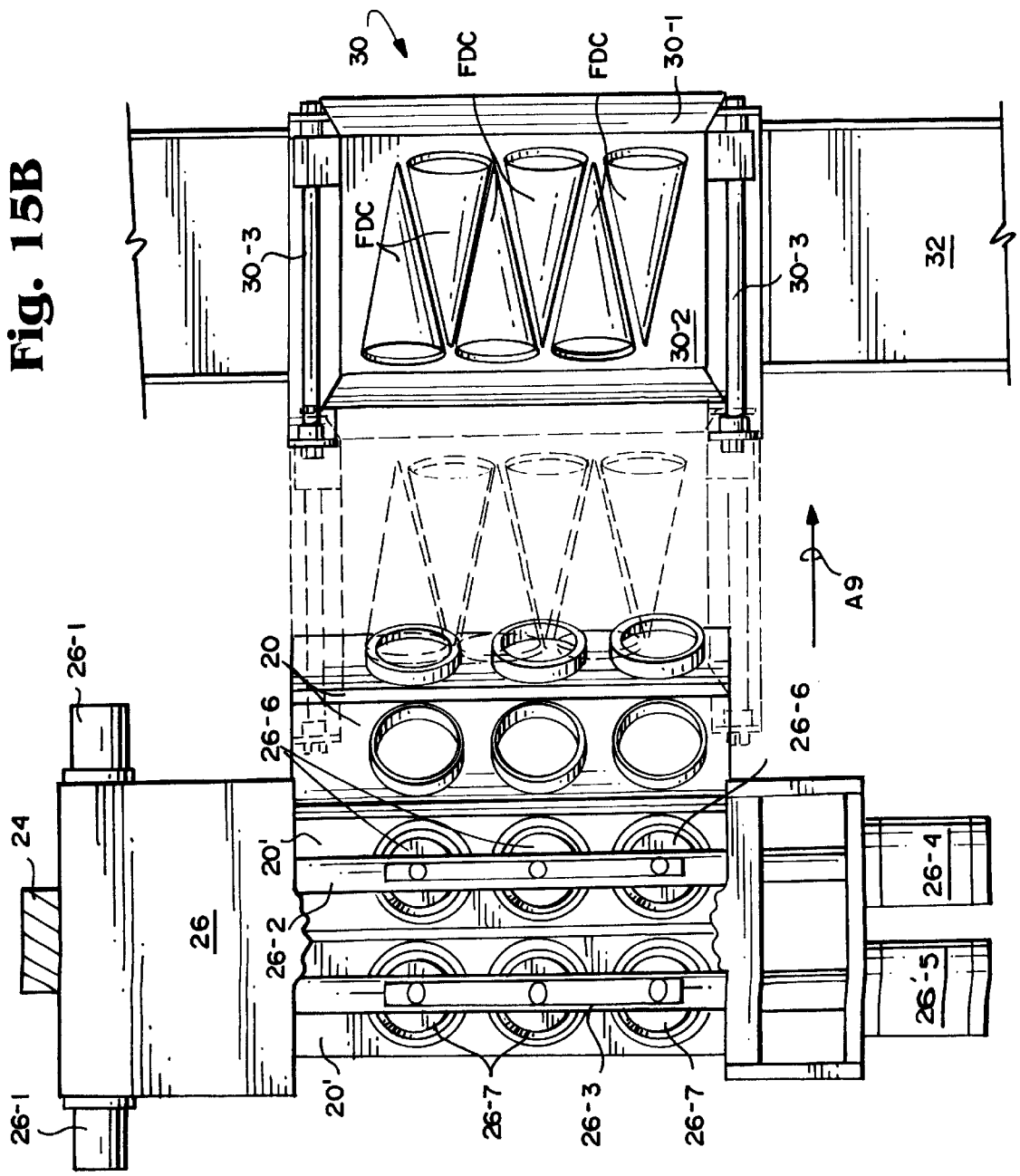

Fig. 16A
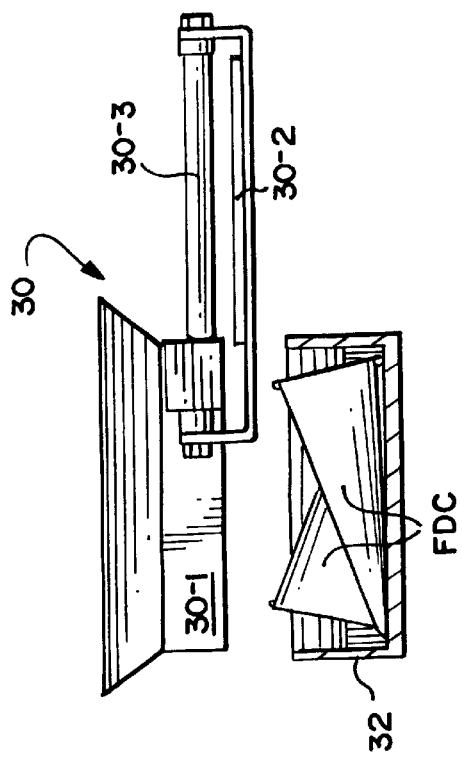
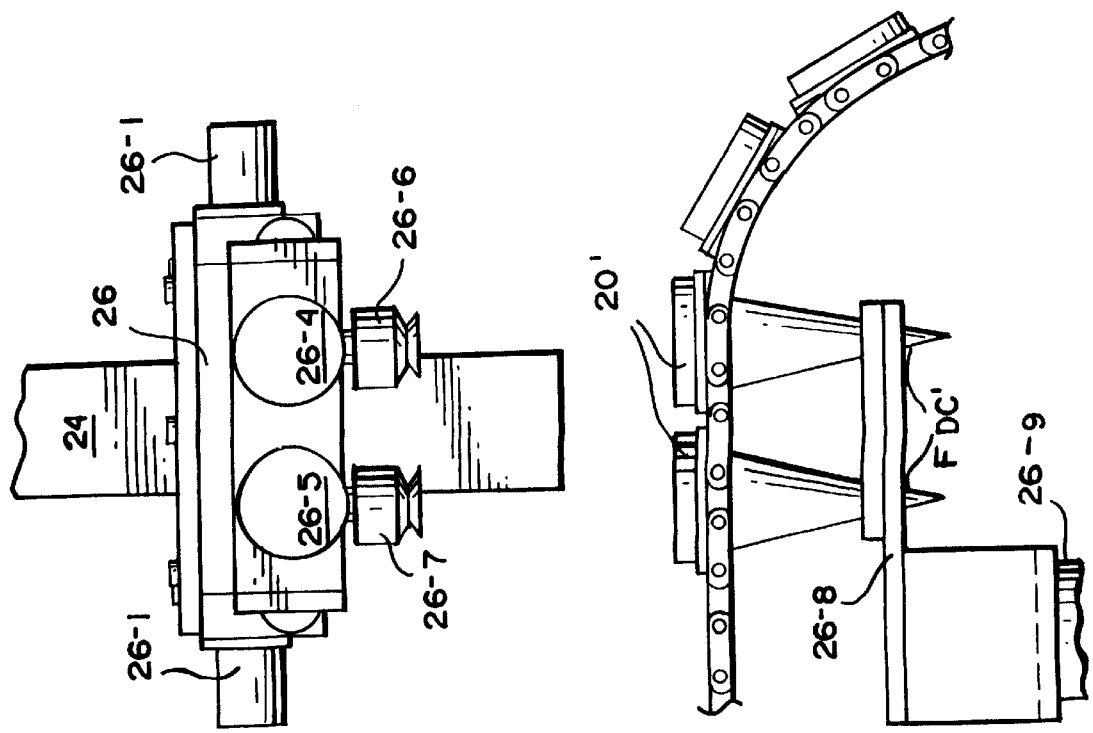

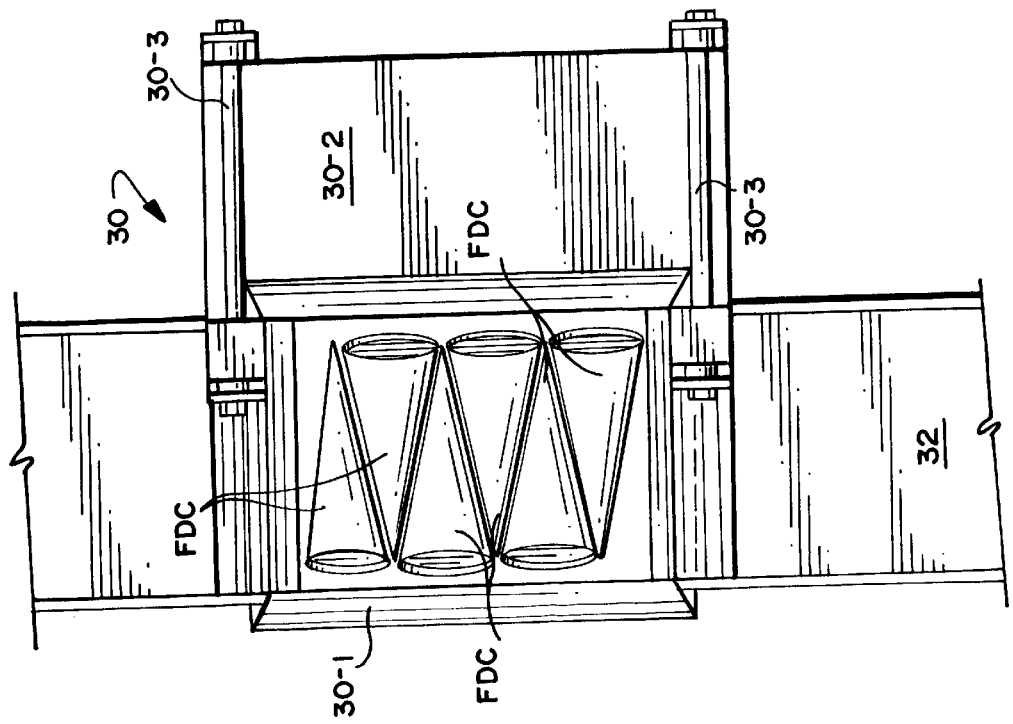
Fig. 16B
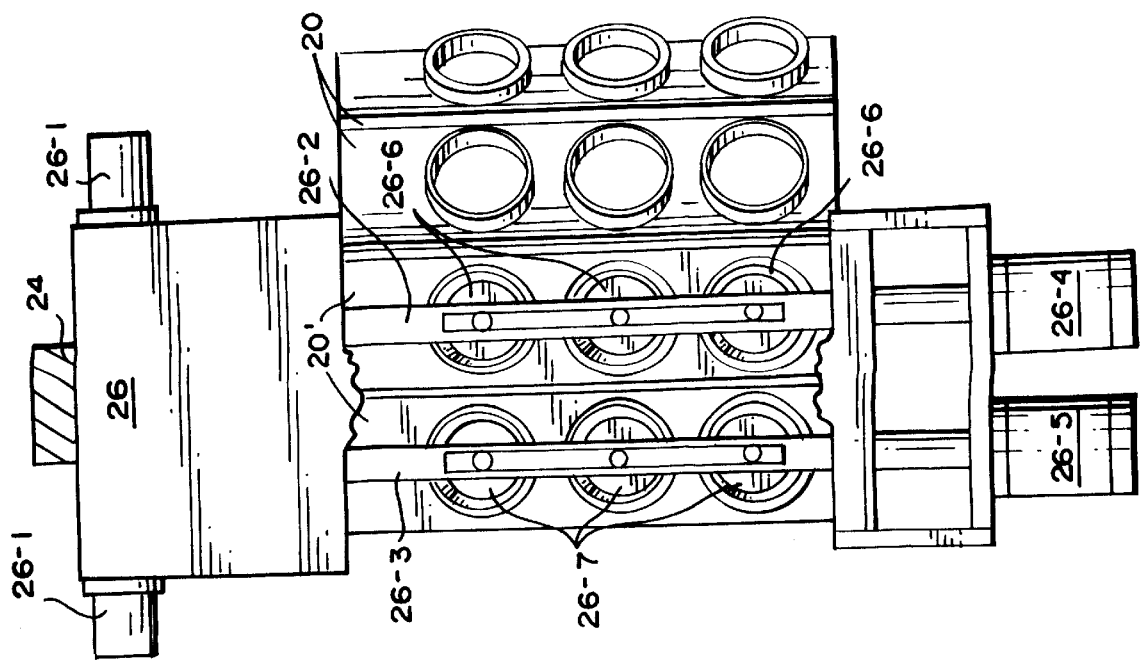

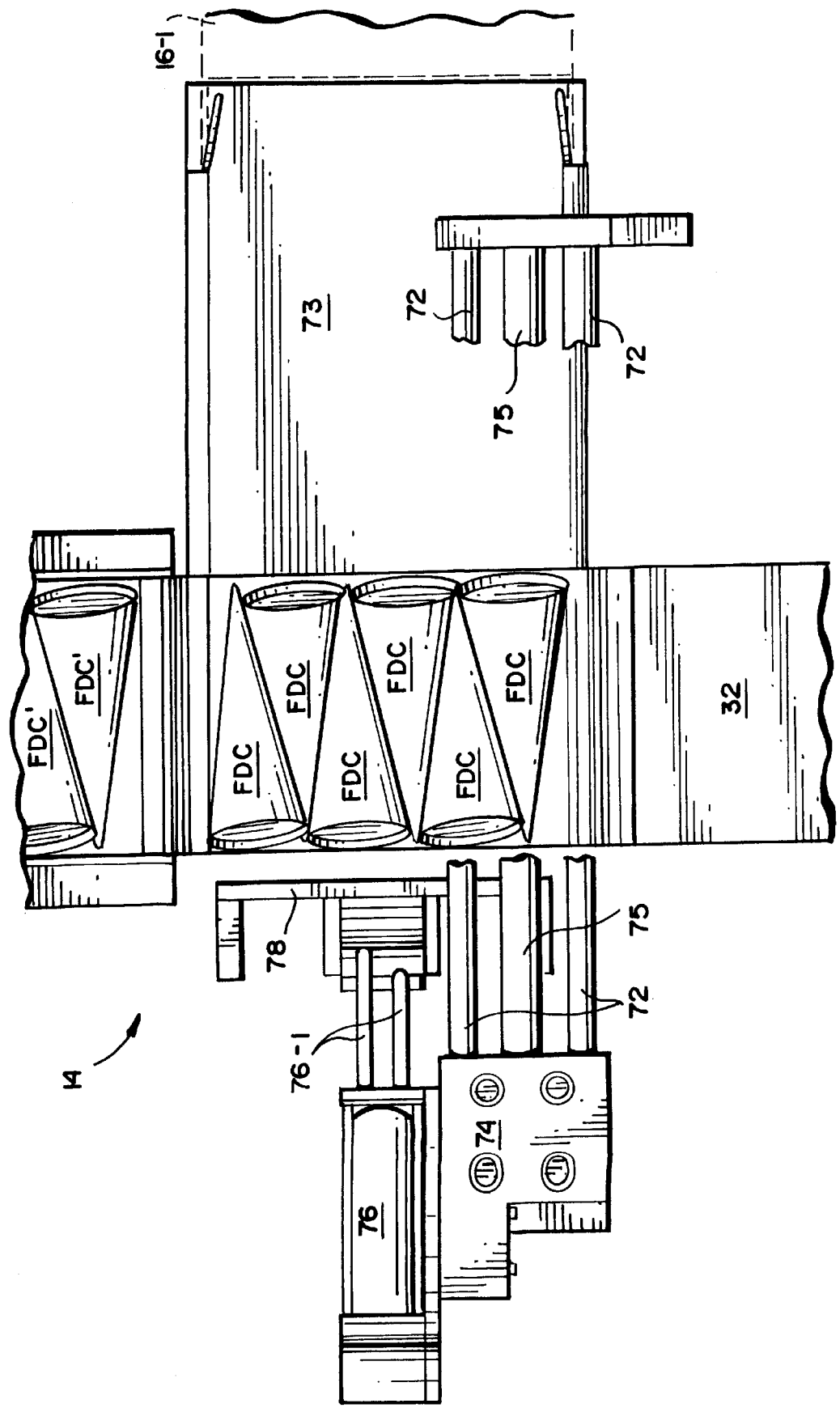

– 1 –
APPARATUS AND SYSTEMS FOR REORIENTING AND TRANSFERRING ELONGATE ARTICLES, ESPECIALLY FROZEN DESSERT CONES

FIELD OF THE INVENTION

The present invention generally relates to automated systems and methods whereby elongate articles may physically be reoriented and then transferred in a reoriented condition from one location to another as may be desired. In particularly preferred embodiments, the present invention relates to systems and methods whereby frozen confections, such as individually wrapped frozen dessert cones, may be reoriented and thereafter transferred automatically from a production line to a packing station.

BACKGROUND AND SUMMARY OF THE INVENTION

Individually wrapped frozen confection or desert cones are well known. Specifically, frozen dessert cones have an edible cone-shaped container (e.g., a sugar cone or the like) which is filled with a freezable dairy product, such as ice cream, ice milk, frozen yogurt or the like. The filled cone is covered with a conformably shaped paper or foil wrapper which is usually closed at its upper end by a lid. When the frozen confection is desired to be consumed, the lid and wrapper are removed thereby allowing the cone and its frozen dairy product to be eaten.

The automated production of frozen dessert cones is well known, for example, through U.S. Pat. No. 4,188,768 to Getman (the entire content of which is expressly incorporated hereinto by reference). In general, frozen dessert cones are produced by intermittently advancing a nested cone assembly (comprised of the frustroconically shaped edible prebaked cone and its conformably shaped paper overwrap) through a succession of stations. Thus, for example, an atomized spray of chocolate (or other flavored syrup) may be sprayed on the interior surfaces of the edible cone prior to the cone being filled with a freezable dairy product. Thereafter, a topping of chocolate (or other flavored syrup) and nuts may be applied immediately upstream of a lid applicator. The finished product is then ejected from its conveyance track and subjected to freezing conditions.

Typically, multiple finished cones are packaged in box board containers and then shipped to retail outlets. The conventional technique to package frozen desert cones is to position them alternately head-to-tail. In such a manner, the alternating head-to-tail arrangement of multiple cones achieves a generally rectangular configuration which more easily allows them to be packaged in standard rectangularly shaped boxes. Transferring the cones from the discharge conveyor and into the boxes in such an alternating head-to-tail arrangement is conventionally accomplished manually. That is, a worker must manually retrieve multiple finished cones from the discharge conveyor and then arrange them in the head-to-tail manner described above—a very time consuming and repetitive endeavor.

Therefore, it would be highly desirable if transfer systems and methods were provided which enable elongate articles, such as frozen desert cones, to be reoriented from their production alignment and arranged alternately in a head-to-tail manner so that the alternating head-to-tail array of articles may the be packaged automatically (e.g., thereby avoiding the repetitive manual operations of conventional packaging operations). It is towards providing such reorientation and transfer systems and methods that the present invention is directed.

Broadly, the present invention is embodied in systems and methods whereby leading and following elongate articles aligned in a head-to-head orientation may be reoriented to form a head-to-tail oriented array of articles. Most preferably, the systems and methods of this invention serve to reorient and thereby transfer an array of multiple pairs of elongate articles from an initial vertical orientation to a side-by-side alternating head-to-tail horizontal orientation. When reoriented so as to be in a staggered, alternating side-by-side horizontal relationship, the multiple pairs of elongate articles may then be placed automatically into a suitable package.

Preferably the elongate articles handled by the present invention are frustroconically shaped frozen dessert cones with a conformable paper overwrap, and specific reference to the same will be made below. However, it is to be understood that virtually any elongate articles regardless of geometry could be handled using the principles of the present invention. When frozen dessert cones are handled, it is most preferable that the apparatus and methods of the present invention reorient an array of multiple pairs of the same so as to be in head-to-tail relationship. Such an orientation will more readily conform the reoriented array of cones to the interior of a box-shaped shipping container.

Thus, according to the present invention, frozen dessert cones may be transferred and reoriented from their production line and into a boxed condition without manual intervention. These and other aspects of the present invention will become more clear after careful consideration is given to the detailed description of the preferred exemplary embodiments thereof which follow.

BRIEF DESCRIPTION OF THE DRAWINGS

Reference will hereinafter be made to the accompanying drawings wherein like reference numerals throughout the various FIGURES denote like structural elements, and wherein;

FIG. 3 is a side elevational view of the transfer apparatus depicted in FIG. 2 as taken along line 3—3 therein;

FIGS. 9A and 9B through FIGS. 16A and 16B depict paired side elevational and plan views, respectively, showing a complete cycle of the primary cone transfer assembly wherein multiple cones are simultaneously removed from the production conveyor, reoriented in a head-to-tail manner, and then transferred to a staging conveyor for the boxing operation; and FIGS. 17A and 17B through 20A and 20B depict paired side elevational and plan views, respectively, showing a complete cycle of a secondary cone transfer assembly wherein the multiple cones arranged in a head-to-tail manner are transferred into an awaiting empty box associated with a boxing station.

DETAILED DESCRIPTION OF THE PREFERRED EXEMPLARY EMBODIMENTS

I. General Discussion

Figure 1:
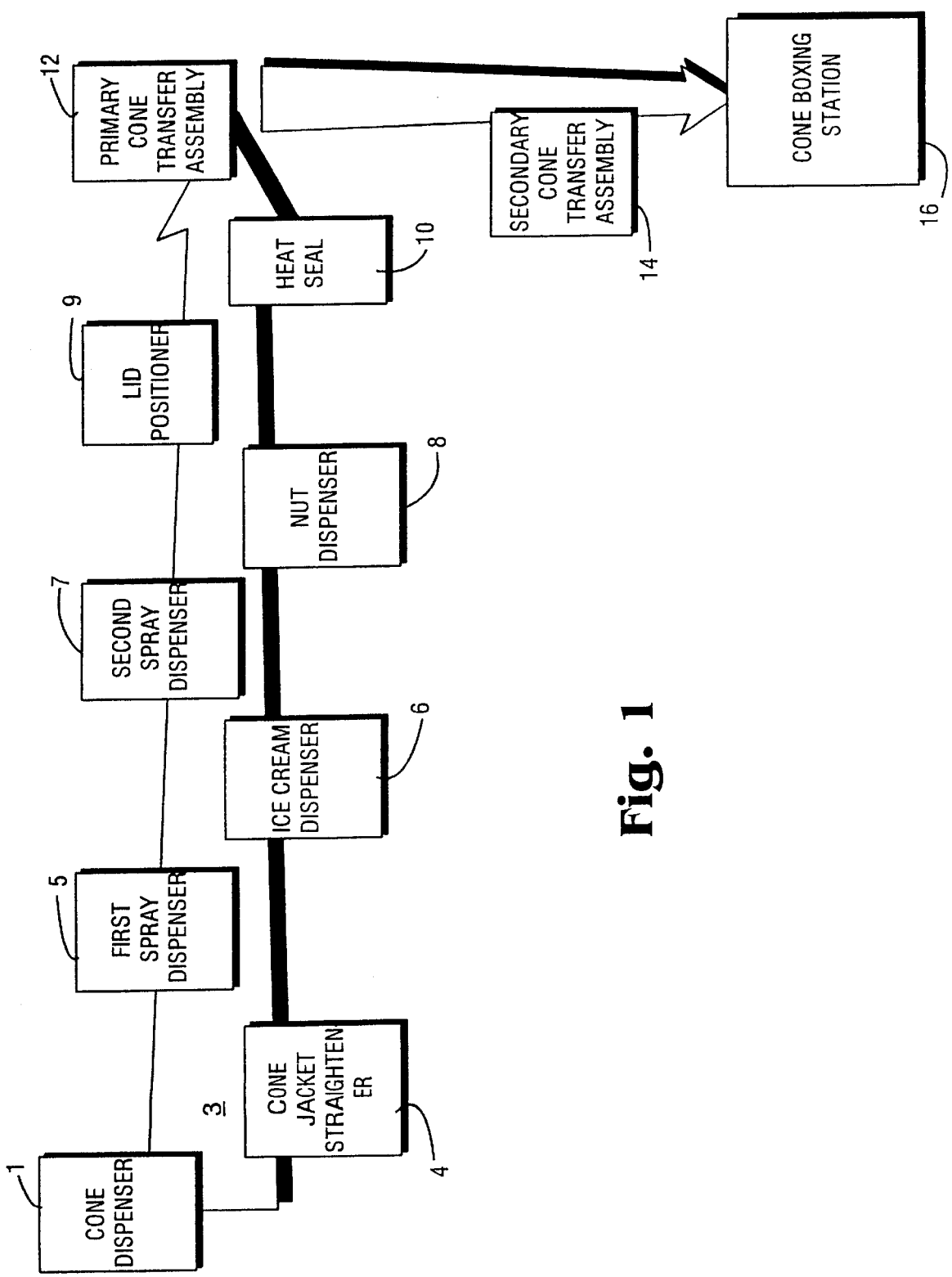
FIG. 1 is a schematic box diagram showing the various stations employed to automatically transfer elongate objects, such as frozen desert cones, from a production line to a boxing line.

Accompanying FIG. 1 depicts schematically the various operations employed in the present invention. Specifically, frozen confection cones may be produced using any number (or all) of the production stations disclosed more fully in the above-cited U.S. Pat. No. 4,188,768 to Getman. That is, the system 1 according to the present invention may include a cone dispensing station 2 whereby nested edible cones and their conformably shaped paper overwraps may be dispensed onto a conveyor 3. The cones may thereafter be brought into the cone jacket straightener 4 which ensures that the cones and jackets are properly positioned on the conveyor 3.

The cones may then be brought sequentially through a first spray dispenser 5, an ice cream dispenser 6 and a second spray dispenser 7. The first spray dispenser 5 dispenses a spray of flavored syrup (e.g., chocolate) so as to coat the interior surface of the cone into which the ice cream is to be dispensed by the dispenser 6. The second spray dispenser 7 will thereafter dispense a flavored syrup topping spray onto the ice cream in the cone. A quantity of nuts may thereafter be applied to the top of the ice cream in the cone by the nut dispenser 8. A paper lid is positioned over the top of the ice cream filled cone by the lid positioner and is heat-sealed to the outer paper wrapper by means of the heat seal unit 10.

Thereafter, the finished cones are transferred by the primary cone transfer station 12 so that multiple pairs of such cones are reoriented from their machine aligned position to a head-to-tail cross-machine position as briefly noted above. The reoriented array of cones may then be brought to the secondary cone transfer assembly 14 where the array is transferred as a unit to a cone boxing station 16. The cone array is thus placed by the secondary transfer station 14 into a suitably configured container at the boxing station 16 conforming to the external shape of the cone array. The boxed cones may then be shipped to retail customers.

Figure 2:
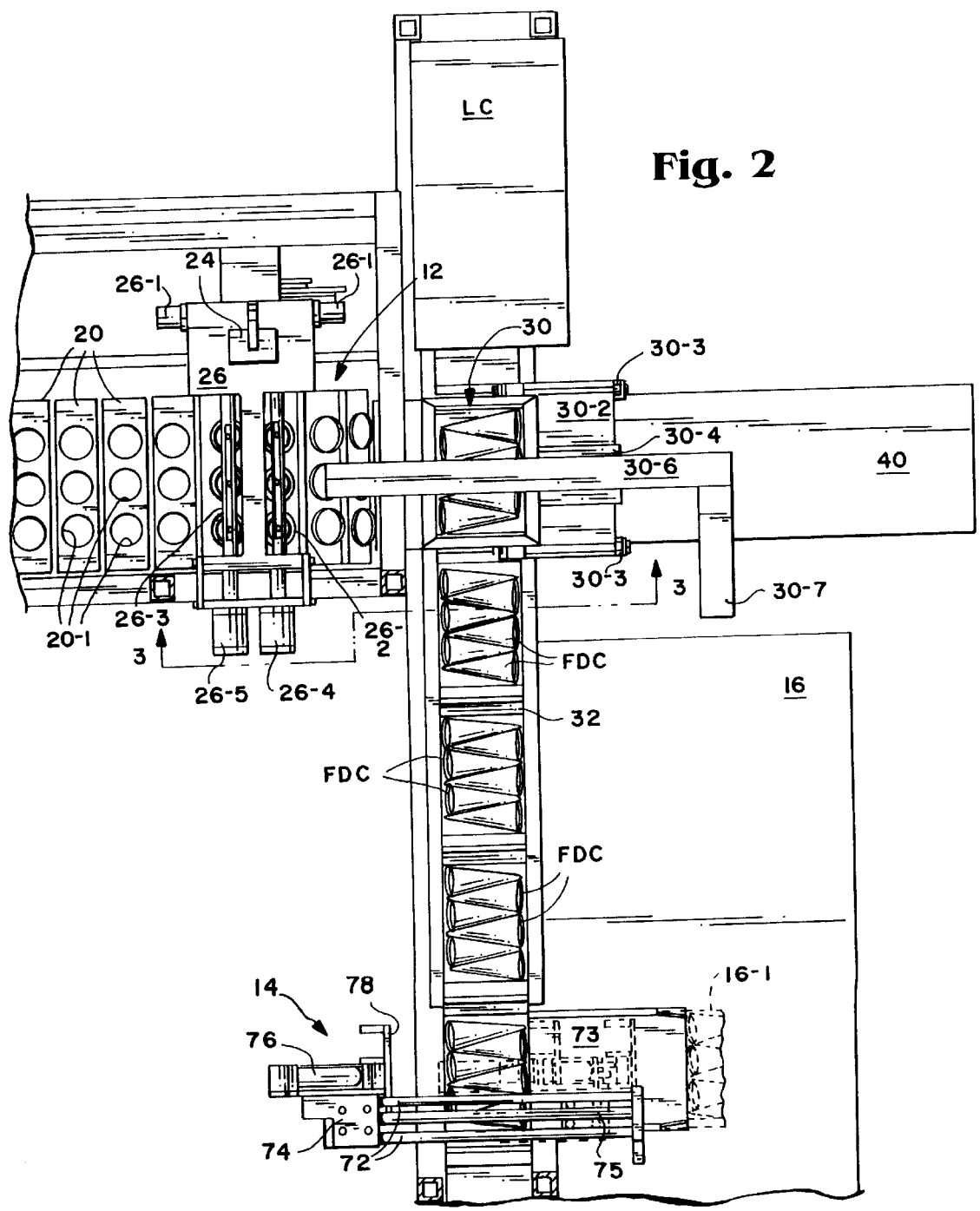
FIG. 2 is a top plan view of the transfer apparatus according to the present invention.

Accompanying FIGS. 2 and 3 show in greater detail the structures associated with the primary and secondary transfer stations 12, 14, respectively, according to the present invention.

II. The Primary Transfer Station and its Operation

As is shown, the frozen dessert cones (a few of which are identified in the accompanying drawings by the identifier FDC) produced upstream of the primary transfer station 12 are supported vertically by a series of linked conveyor trays 20. Each of the trays has a series of holes 20-1 which are sized so that the tail of the cone is disposed below the tray 20, while the head of the cone FDC is disposed above the tray somewhat. The conveyor trays are brought into registry below the primary transfer station by means of a driven sprocket 22 (see FIG. 3) which moves the trays 20 in an intermittent, step-by-step manner in the direction of arrows A-1 as viewed in FIG. 3.

The primary transfer station includes a vertical support column 24 and a primary transfer assembly 26 cantilevered therefrom. The primary transfer assembly 26 thus extends over the linked support trays 20 and is moveable vertically along the support column 24 by means of servo motors 26-1. The primary transfer assembly 26 includes a pair of transfer arms 26-2, 26-3 each of which is rotatable about their respective elongate axes by means of servo motors 26-4 and 26-5, respectively. The support arms 26-2, 26-3, in turn, dependently support a series of transfer heads 26-6, 26-7, respectively, each of which serves to grip a respective one of the cones FDC and reorient it in a manner to be described in greater detail below.

The primary transfer station 12 also includes a transfer tray assembly 30 which receives an array of reoriented cones FDC and positions them onto the transfer conveyor 32. In this regard, the transfer tray assembly 30 includes a tray box 30-1 and a movable bottom wall 30-2. The movable bottom wall 30-2 is most preferably moved rectilinearly via air cylinders 30-3 between open and closed conditions relative to the tray box 30-1 as shown in FIG. 3. When in the open condition, the bottom wall 30-2 is spaced from the tray box 30-1 so as to allow the head-to-tail array of cones FDC to drop from the tray box 30-1 and onto the transfer conveyor 32. On the other hand, when in the closed condition, the bottom wall 30-2 closes the bottom of the tray box 30-1 and thus supports the head-to-tail array of cones FDC within the tray box 30-1 so that the cone array may be carried thereby to the transfer conveyor 32.

The tray assembly 30 is rigidly connected to a support bracket 30-4 which itself is coupled to a shuttle 30-5 of an overhead rail assembly 30-6. The shuttle 30-5 is in turn operatively coupled to a precision motor 30-7. Operation of the motor 30-7 thus drives the shuttle 30-5, and hence the tray assembly 30, rectilinearly along the rail assembly 30-6 towards and away from the primary transfer system 12.

In the event that sensors upstream of the primary transfer station 12 detect that one (or more) of the cones in the array of cones to be transferred is defective (e.g., due to incomplete filling, missing lid, or the like), the sensing heads may be deactivated by the logic controller LC so that the entire array of cones is ejected onto the reject conveyor 40. In this regard, the tail of the cones will be engaged with ejectors (a representative few of which are shown in FIG. 3 by numeral 40-1) downstream of the primary transfer station 12 so as to physically push the rejected cones FDC' onto the reject conveyor 40. Each of the ejectors 40-1 include a traveler (a representative one of which is shown in dashed line in FIG. 3 by numeral 40-2) which travels along a cam slot 40-2 defined in the sprocket 22. The ejectors 40-1 thus do not interfere with the normal removal of acceptable cones FDC at the primary transfer station 12.

The head-to-tail array of cones FDC are brought by the conveyor 32 into alignment with the secondary transfer station 14 which includes a secondary transfer assembly 14-1 which is extendable and retractable relative to the boxing station 16. The conveyor 32 moves synchronously with the periodic advancement of empty boxes (one of which is shown at the boxing station 16 by reference identifier 16-1) formed automatically from box blanks (not shown). Thus, the array of cones FDC will be brought into alignment between the next successive empty box 16-1 and the secondary transfer assembly 14-1 of the secondary transfer station 14. Operation of the secondary transfer assembly 14-1 will thus slidably move the head-to-tail array of cones FDC as a unit into the awaiting empty box 16-1.

Figure 5:
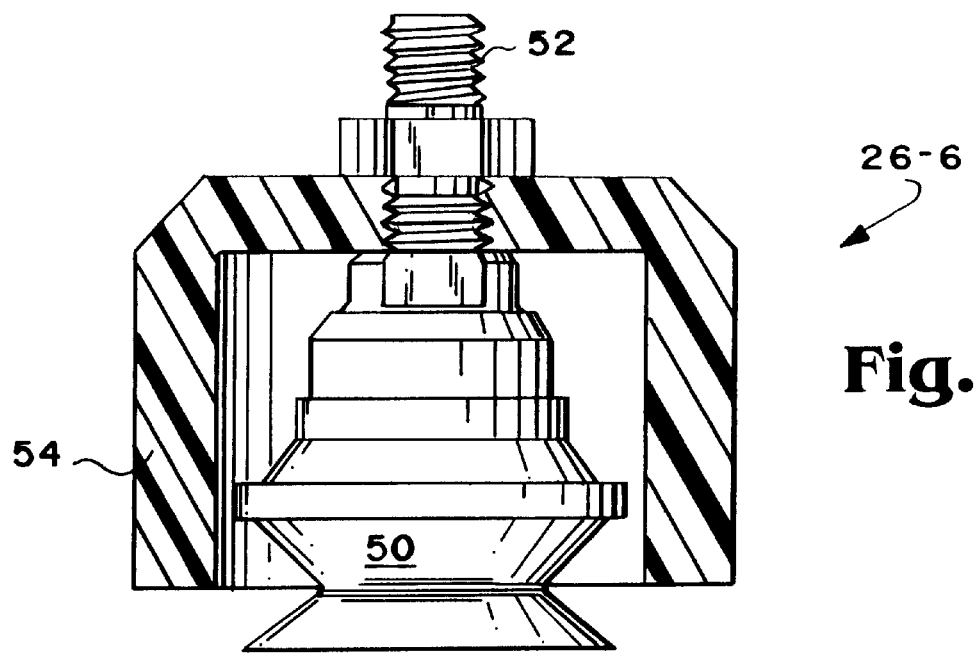
FIG. 5 is a cross-sectional elevational view of the transfer head depicted in FIG. 4 as taken along line 5—5 therein.
Figure 4:
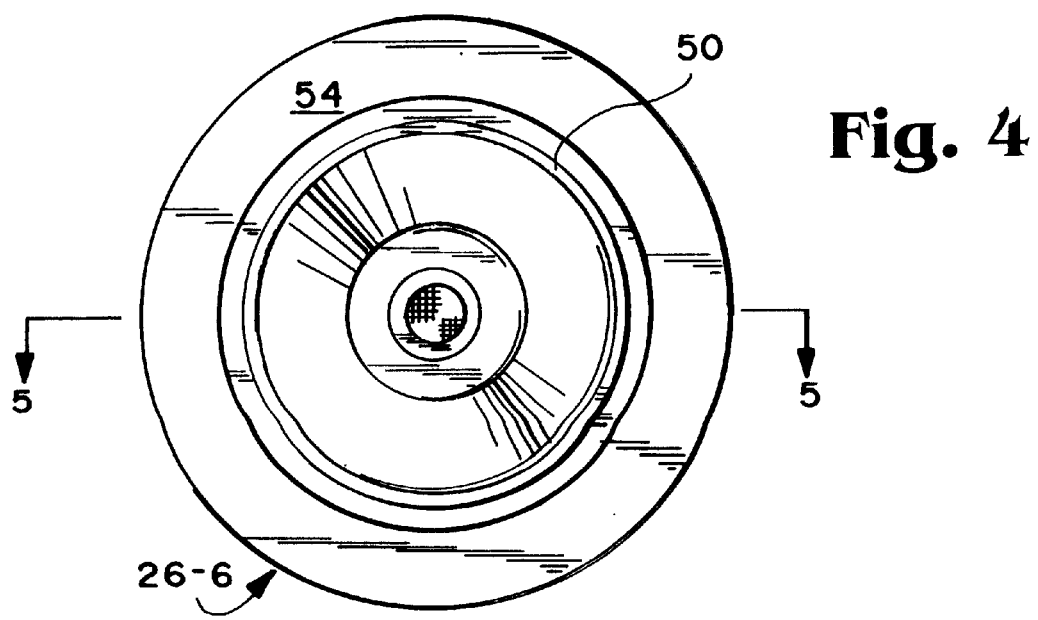
FIG. 4 is a bottom plan view of a preferred transfer head that may be employed in the transfer apparatus of this invention.

Accompanying FIGS. 4–8 depict alternative embodiments of preferred transfer heads that may be employed in the present invention. In this regard, the transfer head 26-6 shown in FIGS. 4 and 5 is representative of the transfer head 26-7 that may be employed by the transfer assembly 26 discussed previously above and is pneumatic. That is, a flexible suction cup 50 is provided which is fluid connected to a source of vacuum (not shown) via conduit 52. The vacuum thereby attracts and holds the head of the cone FIDC to the transfer head 26-6.

An inverted rigid stabilization cup 54 is provided so as to stabilize the cone FDC during pivotal movements thereof by means of the suction cup 50 (as will be discussed in greater detail below). That is, the rigid stabilization cup 54 prevents the weight of the cone from breaking a pressure seal with the suction cup 50 during pivotal movements of the transfer head 26-6. As will be observed the terminal end of the stabilization cup 54 is such that the suction cup 50 extends downwardly therefrom to ensure an adequate fluid-tight seal is formed with the lid of the cone FDC. In use, the stabilization cup 54 is positioned interiorly of the upper rim of the cone's side wail which protrudes above the cone lid and thus may bear against this upper rim somewhat during movements of the transfer head.

Figure 6:
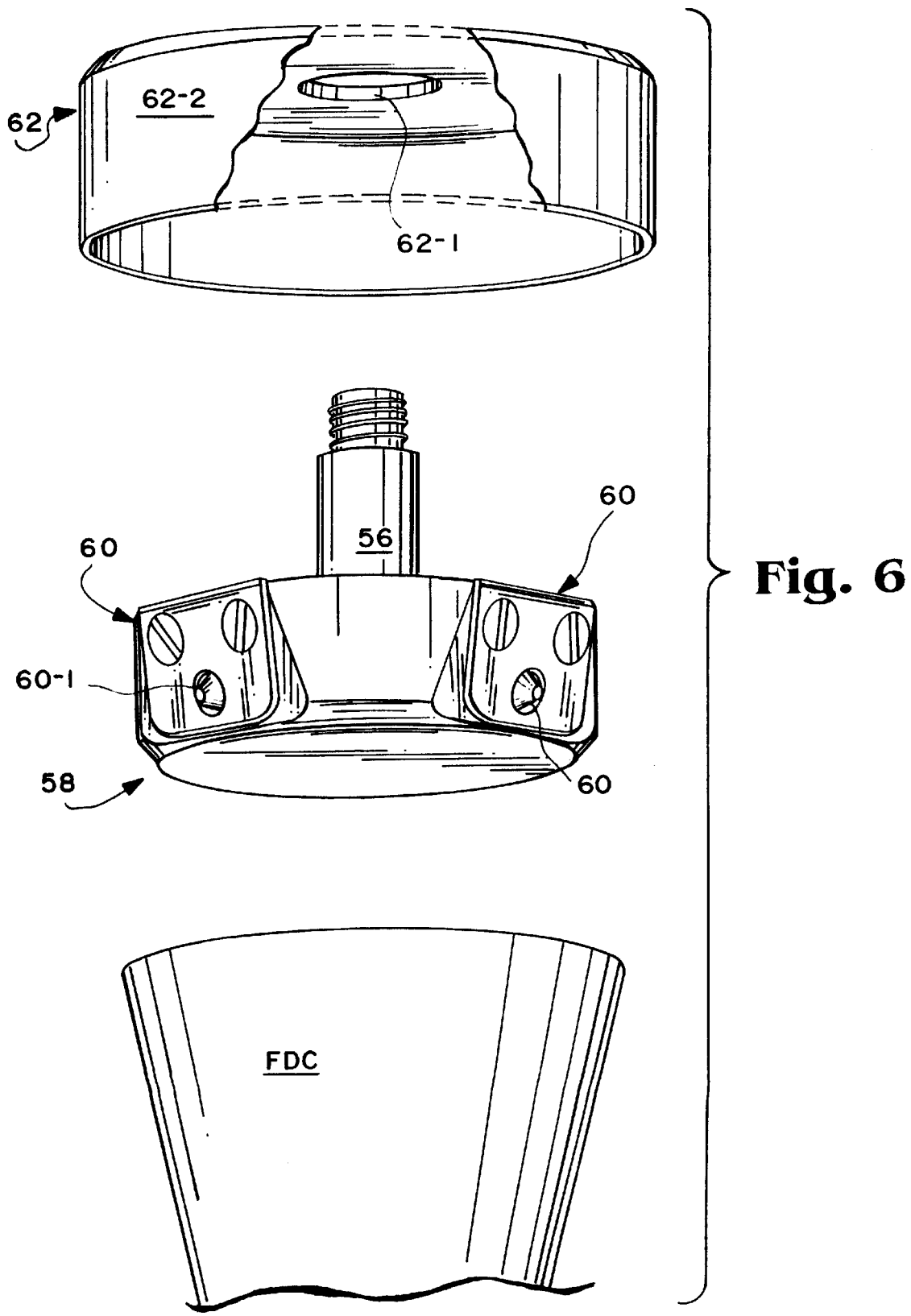
FIG. 6 is an exploded perspective view showing another possible transfer head that may be employed in the transfer apparatus of this invention.
Figure 7:
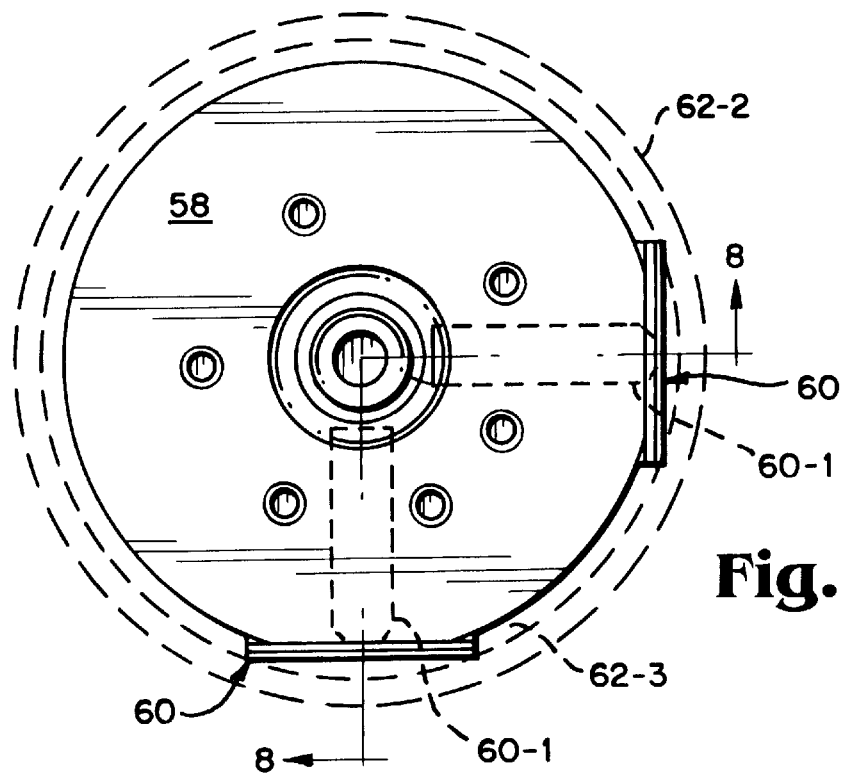
FIG. 7 is a top plan view of the transfer head shown in FIG. 6.
Figure 8:
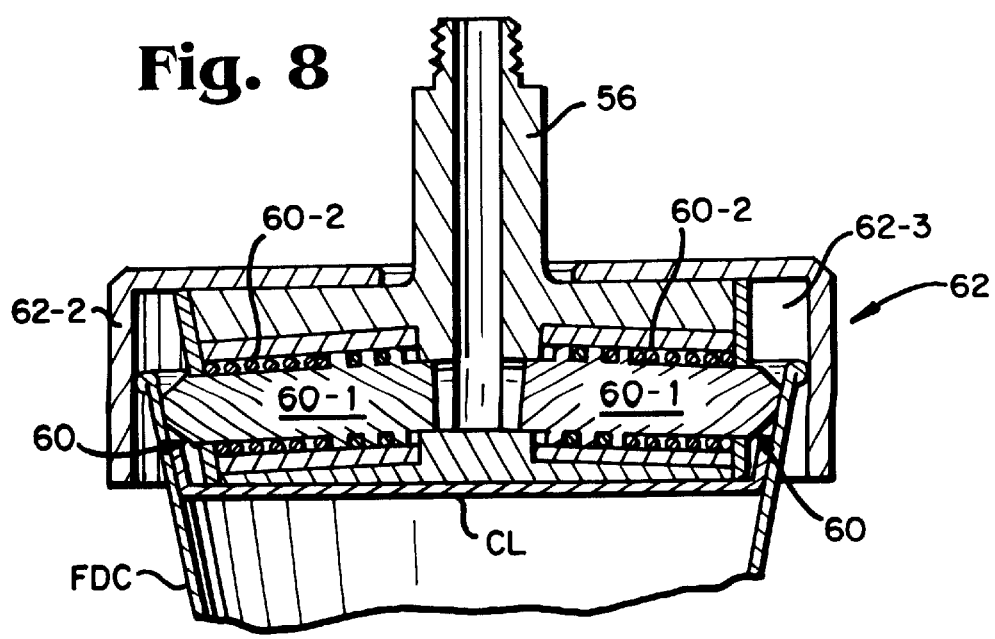
FIG. 8 is a cross-sectional elevational view of the transfer head shown in FIG. 7 as taken along line 8—8 therein.

An alternative transfer head 26-6' is depicted in accompanying FIGS. 6–8. Like the transfer head 26-6 discussed above, the alternative transfer head 26-6' is operated by fluid-connection of its conduit 56 to a source of vacuum (not shown). The conduit extends upwardly from a generally cylindrically-shaped transfer head body 58 which carries at least one, and preferably a pair of, gripping assemblies 60. The transfer head body 58 is sized so as to fit within the upper rim UR of the cone FDC against the cone's lid CL (see FIG. 8). The transfer head body 58 is rigidly carried inside a stabilization cup 62 such that the conduit 56 extends upwardly through the central aperture 62-1 and is connected to the vacuum source. The cup 62 has a wall 62-2 which defines an annular space 62-3 with the exterior surface 58-1 of the transfer head 58 so as to accept therewithin the upper rim UR of the cone FDC during a transfer operation.

As shown in the drawings, the gripping assemblies 60 are radially spaced apart from one another by about 90 20 in the exterior cylindrical surface 58-1 of the body 58. However, the gripping assemblies 60 could be located at other angular orientations relative to one another, for example, 180° if desired. Furthermore, a single one or more than two of the gripping assemblies 60 could be provided as may be desired. For example, three gripping assemblies could be provided radially spaced apart from one another by about 60° about the surface 58-1.

The gripping assemblies 60 include elongate finger elements 60-1 which are housed within the body 58 for reciprocal movements between an extended position (wherein the terminal end of the finger element frictionally pinches the upper rim UR of the cone FDC against the wall 62-2 of the stabilization cup 62) and a retracted position (wherein the finger member 60-1 is withdrawn sufficiently to be disengaged with the upper rim UR of the cone FDC and thus allow the upper rim UR to be moved freely into and out of the annular space 62-3). Compression springs 60-2 act on respective ones of the finger elements 60-1 so as to normally bias the same into their retracted positions. Thus, in the absence of pressurized air introduced into the conduit 56, the finger elements 60-1 will be retracted into the body 58 thereby releasing the cone FDC (i.e., as shown in FIG. 7) by virtue of the bias force provided by spring elements 60-2. Conversely, upon pressurized air being introduced into the conduit 56, the finger elements 60-1 will extend outwardly from the body 58 against the bias force provided by spring elements 60-2 so as to grip the upper rim UR of the cone FDC. O-rings 60-3 are provided so as to seal the finger elements 60-1 to permit actuation by pressurized air introduced through conduit 56 as described above.

It will be appreciated that a vacuum could be employed as a means to move the finger elements 60-1 between their respective retracted and extended positions. That is, if a vacuum is employed, then tension spring elements are preferably used so as to bias the finger elements 60-1 into their extended positions. In such a case, the vacuum could be introduced through the conduit 56 so as to cause the finger elements 60-1 to retract into the body 58 against the bias force of the tension spring elements.

Accompanying FIGS. 9A, 9B through 16A, 16B are paired sequence drawings in elevation and plan views, respectively, which depict an operational cycle of the primary transfer station 12. As noted briefly above, the cones FDC are presented to the primary transfer station 12 by virtue of the sequential step-by-step advancement of the conveyor trays 20. Thus, at the beginning of the transfer cycle at the primary transfer station 12, a pair of trays 20 will be aligned with a respective one of the support arms 26-2, 26-3 associated with the primary transfer assembly 26 as shown in FIGS. 9A and 9B. (It will, of course, be understood that the upstream and downstream trays 20 are not visible in many of the FIGURES to be discussed hereinafter for ease of presentation and discussion.) At this point in time, the tray assembly 30 will be positioned so that the tray box 30-1 is positioned in registry above the transfer conveyor 32 with the bottom wall 30-2 thereof being in its open condition.

As should also be observed in FIGS. 9A and 9B, the primary transfer assembly 26 is in a raised position relative to the trays 20. Upon issuance of a command signal from the logic controller LC, however, the servo motors 26-1 will cause the transfer assembly 26 to be lowered (arrow A-2 in FIG. 10A) into a position such that the transfer heads 26-2, 26-3 thereof are brought into contact with the heads of the cones FDC. At the same time, the cone assist plate 26-8 is moved upwardly (e.g., via cylinder 26-9) relative to the cones FIDC so that their respective tops are displaced upwardly relative to the trays 20. Such a state is shown in FIGS. 10A and 10B. Each of the transfer heads 26-2, 26-3 will therefor pneumatically capture a respective one of the cones FDC in alignment therewith by virtue of their fluid-connection to a source of vacuum (not shown). Thereafter, the logic controller LC will issue a command signal to the primary transfer assembly 26 causing it to raise (arrow A-3 in FIG. 11A) and thereby carrying with it the captured cones FDC.

Once the tails of the cones FDC are clear of their respective trays 20, and simultaneously while the transfer assembly 26 continues its upward movement, the logic controller will issue a series of command signals which will sequentially cause the transfer arm 26-3 to shift laterally (i.e., in a cross-machine direction as shown by arrow A-4 in FIG. 11B) causing the transfer heads 26-6, 26-7 and the cones FDC captured thereby to be misaligned in the machine direction (i.e., in the direction of arrow A-1 as shown in FIG. 9A). Practically immediately thereafter, the logic controller LC will issue a command signal causing the servo motors 26-4, 26-5 to operate thereby responsively counter-rotating the support arms 26-2, 26-3 and the cones FDC captured by their respective transfer heads 26-6, 26-7 (i.e., in the directions of arrows A-5 and A-6, respectively, in FIG. 11A).

At the same time as the transfer assembly 26 is removing the cones FIDC from their respective trays 20, the tray assembly 30 is beginning its forward movement as indicated by arrow A-7 in FIGS. 11A and 11B. Prior to advancing forwardly toward the primary transfer assembly 26, however, the bottom wall 30-2 of the tray assembly 30 will be moved into its closed condition by the air cylinders 30-3 so as to close the tray box 30-1 as discussed previously. As noted above, the movement of the tray assembly towards and away from the primary transfer assembly 26 is effected by the operation of the servo motor 30-7 which drives the tray assembly 30 via its interconnection to the shuttle 30-5.

As shown in FIGS. 12A and 12B, the primary transfer assembly 26 will reach its uppermost position while the tray assembly 30 continues to move in the direction of arrow A-7. It should be observed in this regard that the uppermost position of the primary transfer assembly 26 as depicted in FIGS. 12A and 12B is higher relative to the trays 20 as compared to the position of the primary transfer assembly 26 at the beginning of its cycle (i.e., as shown in FIGS. 9A and 9B). The cones FDC captured by their respective transfer heads 26-6, 26-7 will be alternately disposed relative to one another such that their respective tails point in opposite directions upstream and downstream relative to the machine direction.

Figure 13A:
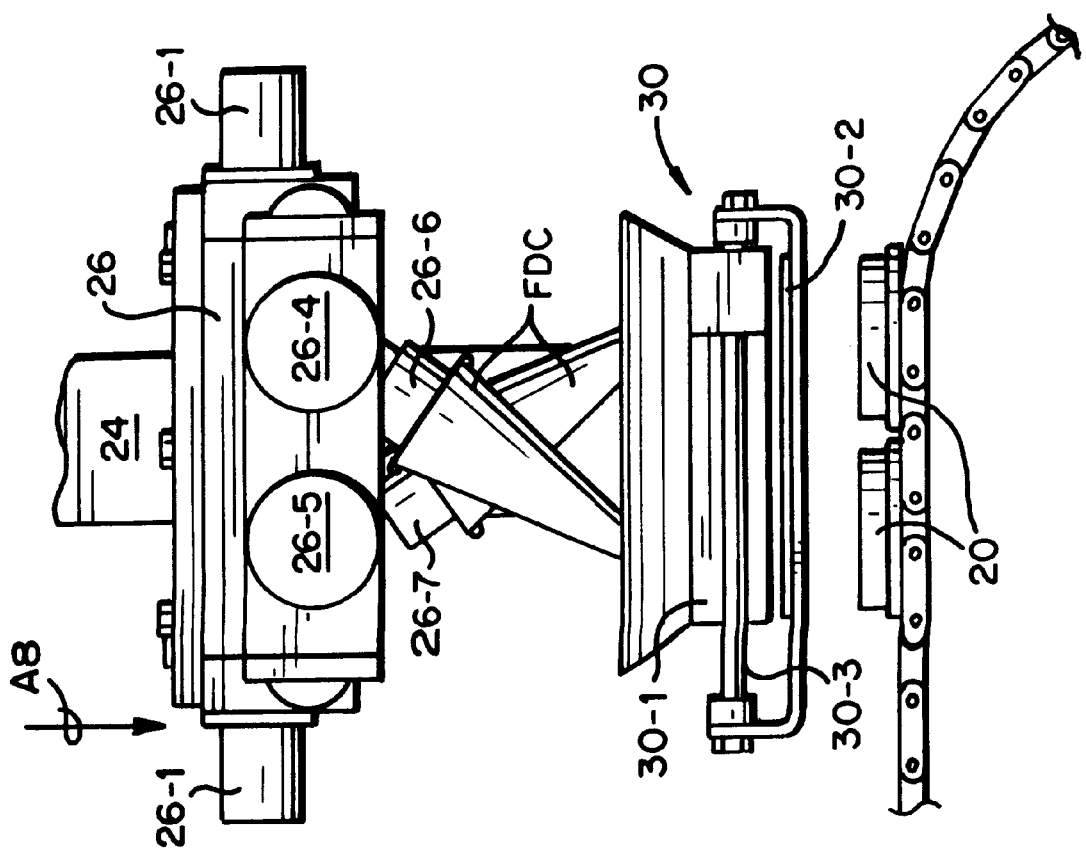

Upon reaching the end of its travel, as shown in FIGS. 13A and 13B, the tray assembly 30 will be positioned immediately below the alternately disposed and oppositely directed cones FDC captured by their respective transfer heads 26-6, 26-7. At this time, the transfer assembly will be lowered somewhat (arrow A-8 in FIG. 13A) so that it once again assumes its start position. Lowering the primary transfer assembly 26 will thus cause the tails of the cones FDC to be closer the tray box 30-1 and its bottom wall 30-2 so that they may be dropped thereinto without substantial rebound. Thus, after being lowered into its initial position, the vacuum may be interrupted to the transfer heads 26-6, 26-7 causing the cones FDC to drop by gravity onto the bottom wall 30-2 of the tray box 30-1 as shown in FIGS. 14A and 14B. The tray assembly 30 thus collects the transferred cones FDC in an alternating head-to-tail array. Substantially immediately thereafter, the servo motors 26-4 and 26-5 are again caused to operate by a signal from the logic controller LC so as to rotate the transfer arms 26-2 and 26-3 to their starting position—i.e., in a direction opposite to arrows A5 and A6 as shown in FIG. 11A so that the transfer heads 26-6 and 26-7, respectively, are again vertically disposed.

Figure 15A:
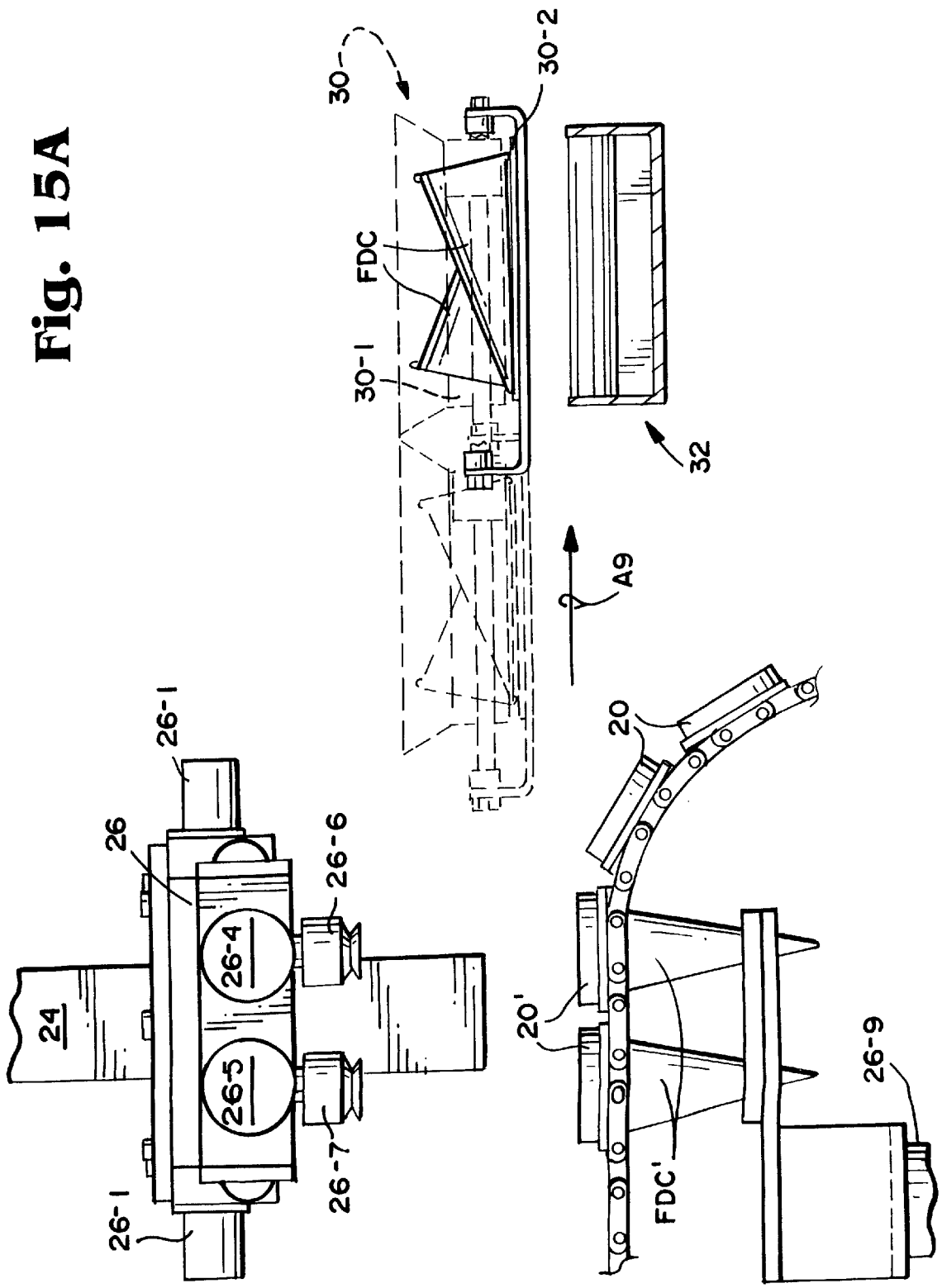

The tray assembly 30 is then caused to move away from the primary transfer assembly in the direction of arrow A-9 as shown in FIGS. 15A and 15B until the tray box 30-1 is positioned vertically above the transfer conveyor 32. At this time, the conveyor trays 20 are moved in a stepwise manner in the direction of arrow A-1 so as to present another pair of trays (designated 20' in FIGS. 15A and 15B) and their associated cones (designated FDC' in FIGS. 15A and 15B). Substantially immediately after being positioned above the transfer conveyor 32, the air cylinders 30-3 are operated by a command signal from the logic controller LC so as to move the bottom wall 30-2 into its opened position thereby allowing the head-to-tail array of cones FDC to drop by gravity from the tray box 30-1 and onto the transfer conveyor 32.

III. The Secondary Transfer Assembly

The head-to-tail array of cones FDC which have been transferred from the conveyor trays 20 to the transfer conveyor 32 are then brought into the proximity of the secondary transfer assembly 14. The secondary transfer assembly 14 serves to transfer the head-to-tail array of cones FDC into an awaiting empty box 16-1 formed by a conventional automated boxing machine 16 (see FIG. 2).

Figure 17A:
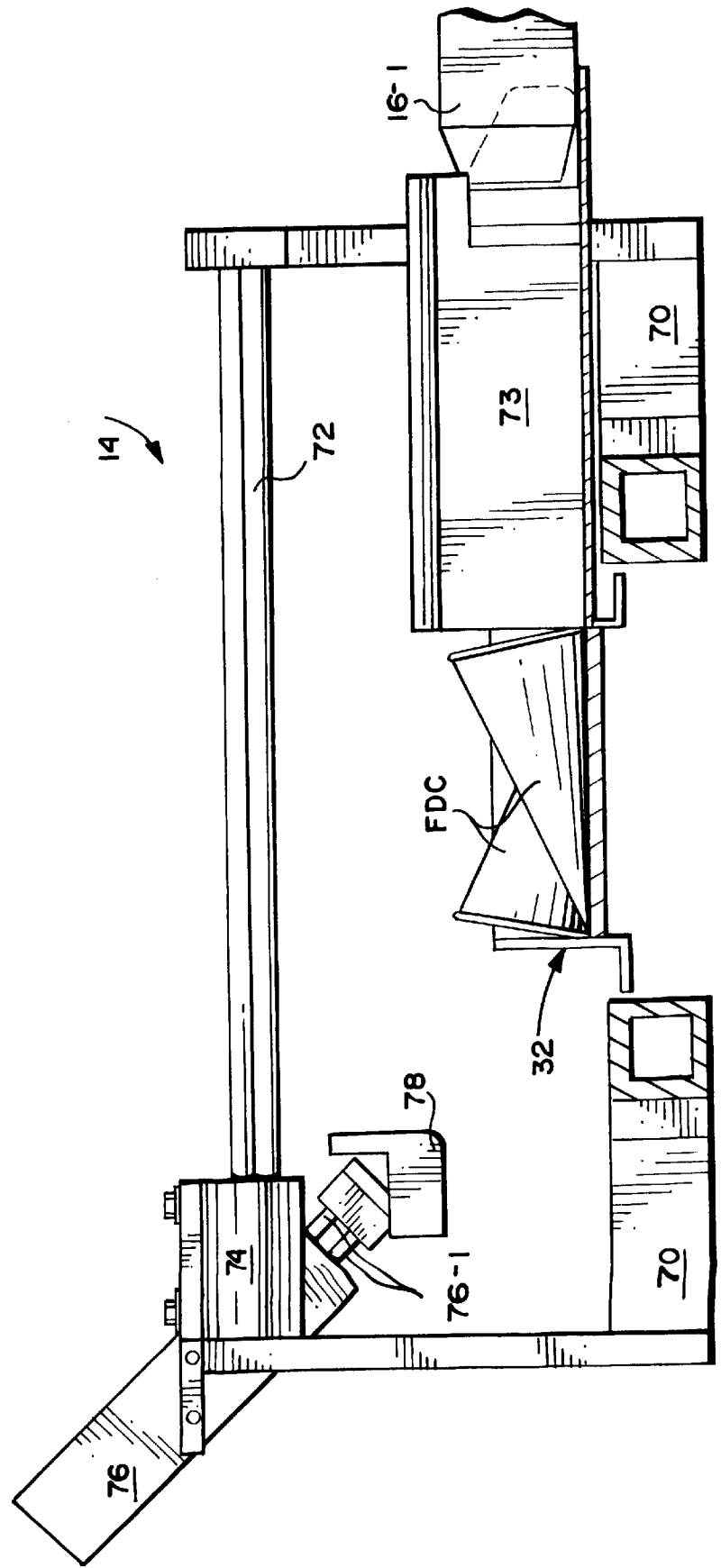
Figure 17B:
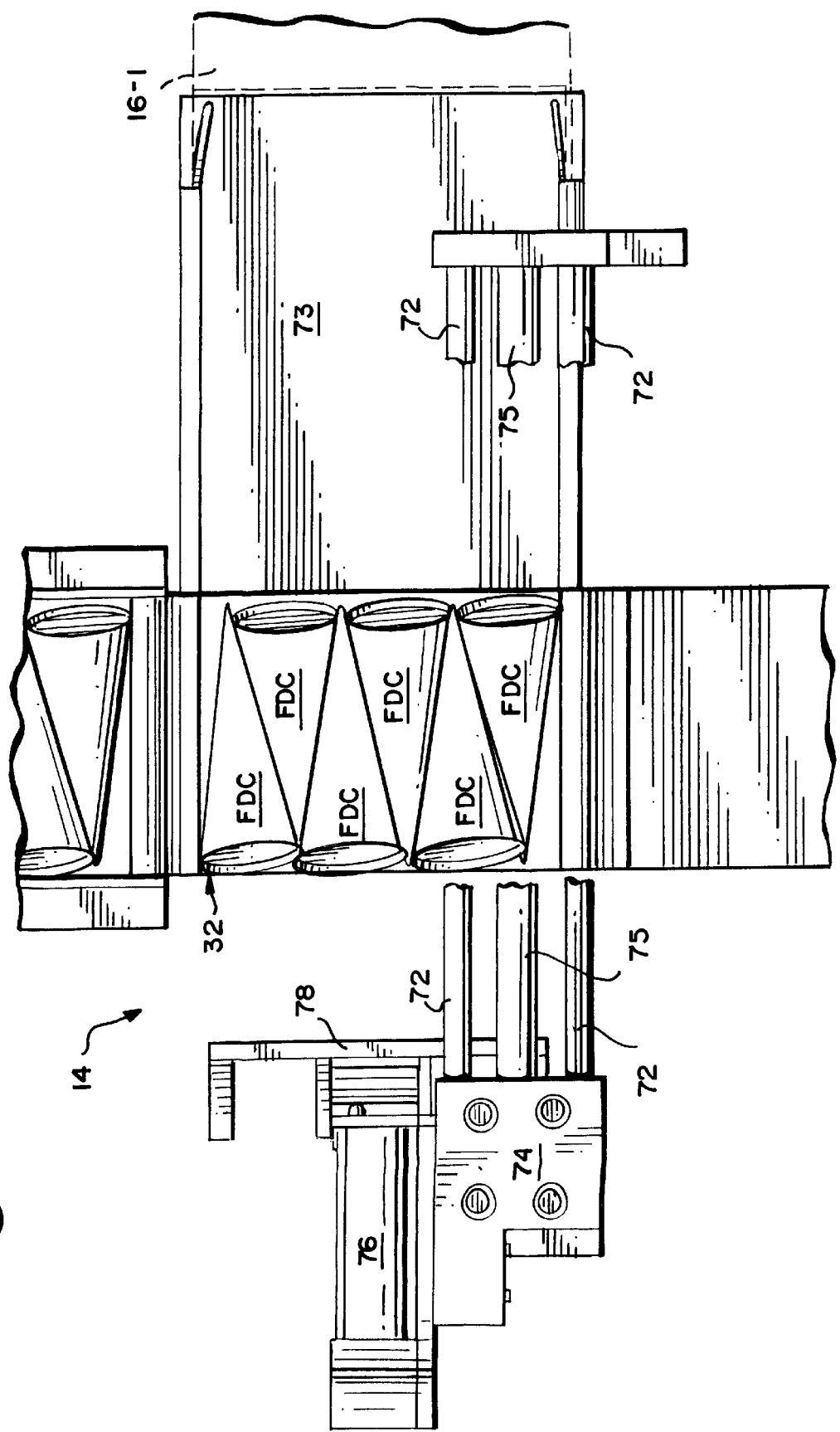

Specifically, as shown in FIGS. 17A and 17B, the secondary transfer assembly 14 generally includes a support frame 70 which supports guide rails 72 positioned above the transfer conveyor 32. The frame 70 also supports an intermediate tray 73 which spans the distance between the transfer conveyor and the awaiting empty box 16-1 associated with the boxing station. The guide rails 72, in turn support a coupling member 74 which is slidably moveable along the guide rails in reciprocal rectilinear directions. The coupling member 74 is connected operatively to an actuator 75. Thus, in response to actuation of the actuator 75, the coupling member 74 is caused to move rectilinearly towards and away from the awaiting empty box 16-1 along the rails 72. Most preferably, the actuator 75 is a rodless actuator which is magnetically coupled to the coupling member 74. One presently preferred actuator 75 is the Ultran Slide Rodless Cylinder Model No. UGS-1219-B which is commercially available from Bimba Manufacturing Col of Munce, Ill.

The coupling member 74 carries an air cylinder actuator 76 which includes actuator rods 76-1 coupled to a distal push plate 78. Upon receiving appropriate signals from the logic controller LC, pressurized air will be directed to the cylinder 76 so as to cause the push plate 78 to be advanced toward, or retracted from, the transfer conveyor 32.

In operation, the secondary transfer assembly 14 begins its transfer cycle in a condition as shown in FIGS. 17A and 17B. That is, the coupling member 74 is moved into its fully rearward position as shown so that the push plate 78 is located physically on a lateral side of the transfer conveyor 32 opposite of the boxing station 16. Furthermore, the push plate 78 is in its fully retracted position. Thus, the push plate is located physically above and laterally of the head-to-tail array of cones FDC which have been brought into registry with the secondary transfer assembly 14 by the transfer conveyor 32 in opposition to the awaiting empty box 16-1.

Figure 18A:
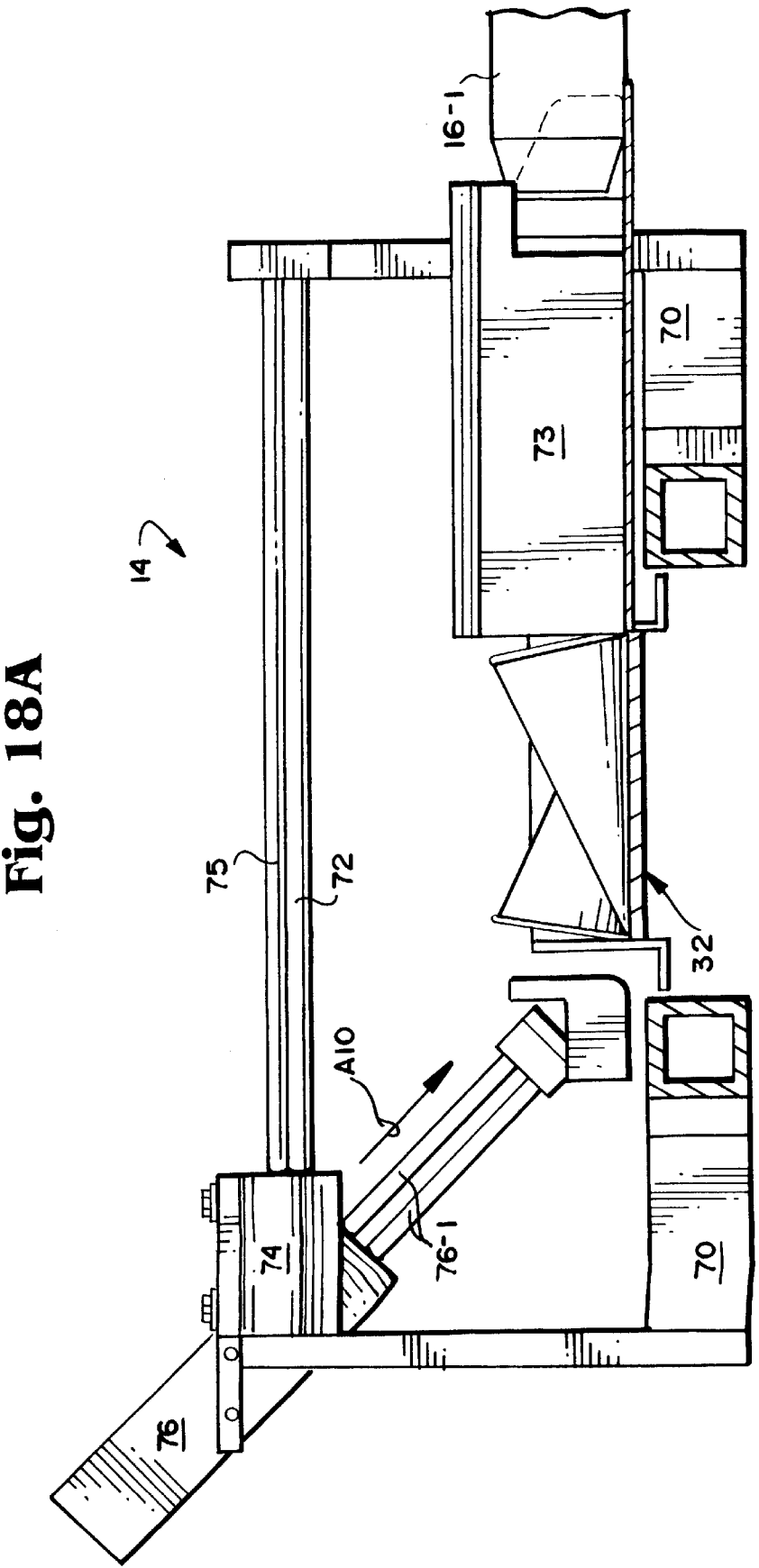
Figure 19A:
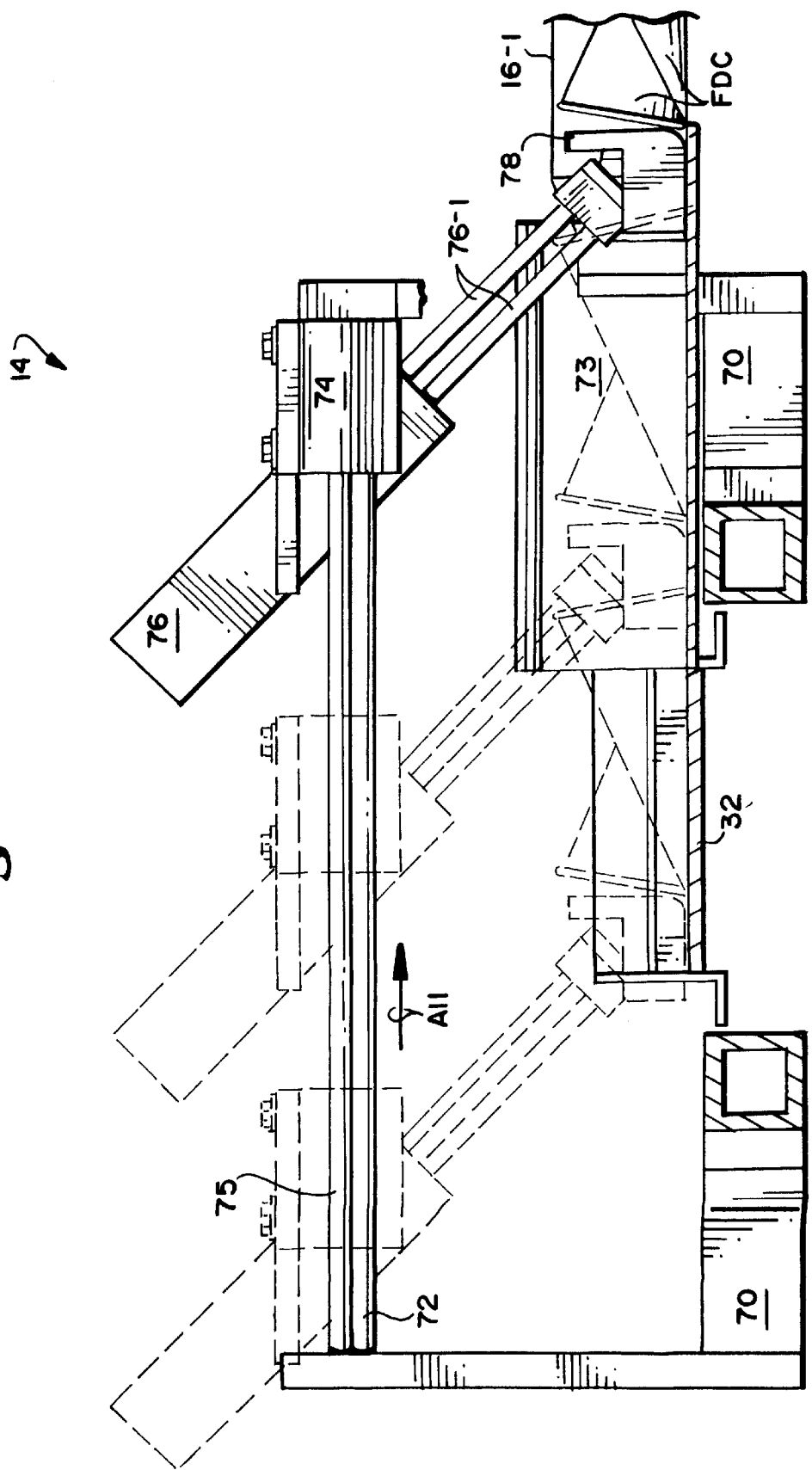
Figure 19B:
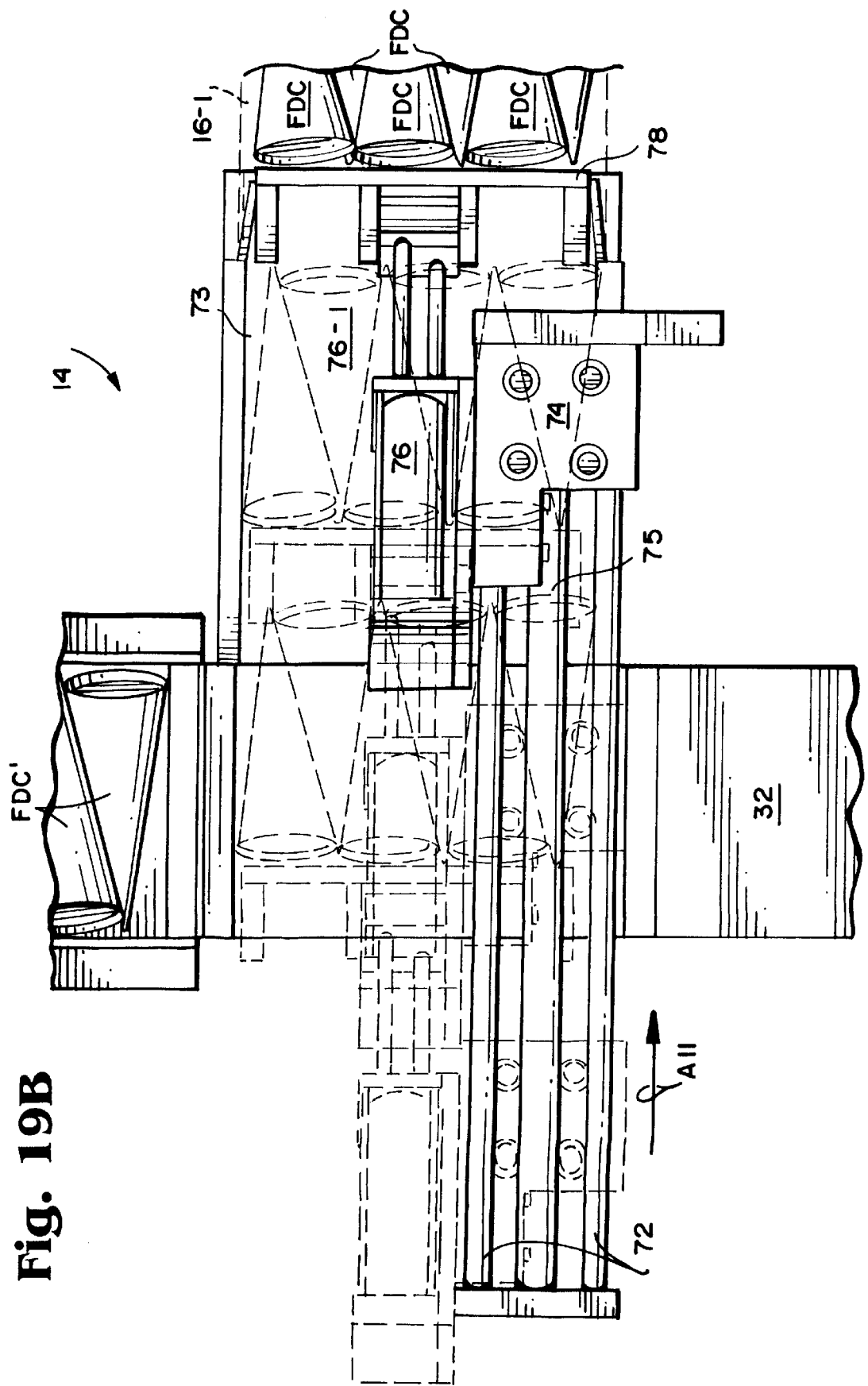

Upon receipt of a control signal by the logic controller LC, the actuator 76 is activated so as to cause the actuator rods 76-1 to extend thereby lowering the push plate 78 toward the transfer conveyor 32 (arrow A-10 in FIG. 18A) and the awaiting head-to-tail array of cones FDC in position thereon as shown in FIGS. 18A and 18B. The logic controller will then issue a signal to the actuator 75 thereby causing the coupling member 74 to advance forwardly (arrows A-11 in FIGS. 19A and 19B) towards the awaiting empty box 16-1 associated with the boxing station 16.

Figure 20A:
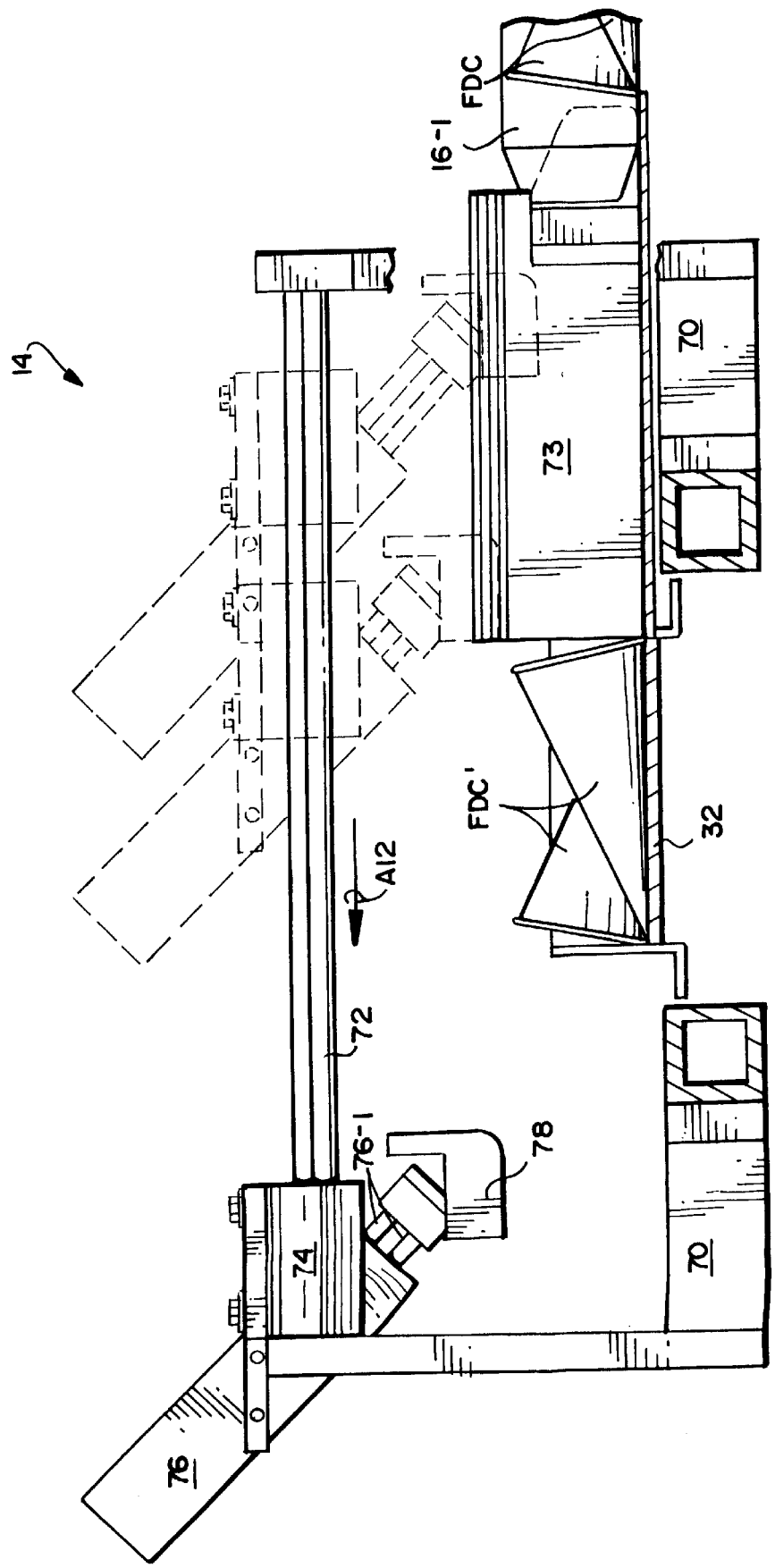
Figure 20B:
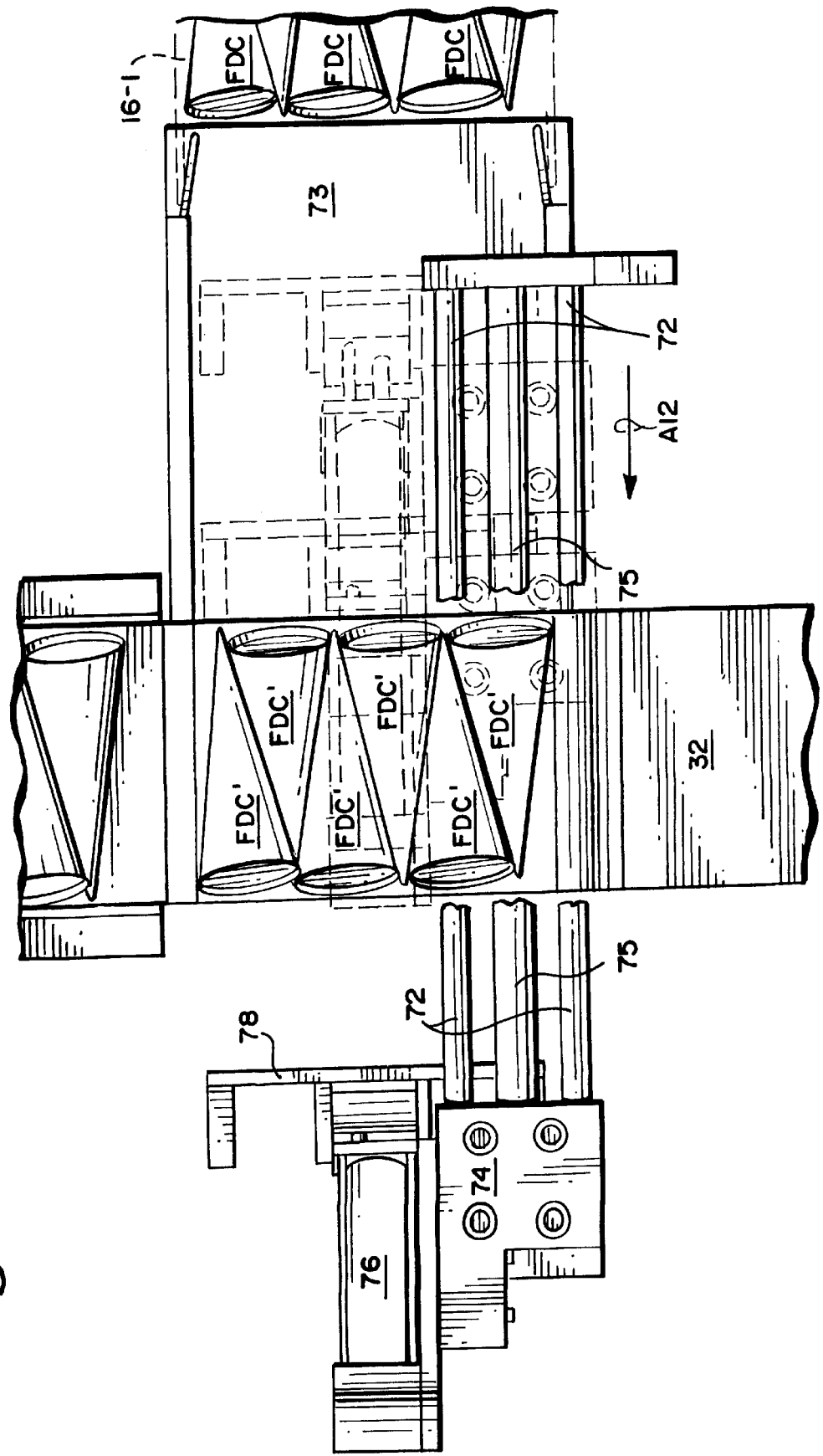

At the forwardmost extent of its travel, therefore, the head-to-tail array of cones FDC are pushed physically into the awaiting empty box. Thereafter, as shown in FIGS. 20A and 20B, the secondary transfer assembly 14 is caused to move rearwardly (arrows A-12 in FIGS. 20A and 20B) simultaneously with retraction of the push plate 78 from its lowered position and into its raised position. Once the secondary transfer assembly 14 returns to its initial position, the conveyor 32 may be indexed so as to move the next array off cones FDC into proper transfer position in relation to the assembly 14. Meanwhile, the boxed array of cones FDC proceeds on to a downstream location (e.g., a product collection site) after having the box flaps sealed.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Apparatus for reorienting leading and following ones of elongate articles from an initial orientation wherein the leading and following ones of elongate articles are aligned in a first plane, and into a laterally alternating head-to-tail orientation wherein the elongate articles lie in a side-by-side position in a second plane substantially perpendicular to said first plane, said apparatus comprising:

a transfer assembly having a number of transfer heads; and a controller for (i) moving said transfer assembly so as to cause said transfer heads thereof to capture respective head portions of said leading and following ones of said elongate articles while in said initial orientation, (ii) simultaneously laterally shifting said transfer heads so that said leading and following ones of said articles are misaligned with one another in a direction laterally to said first plane, and (iii) simultaneously pivotally moving said transfer heads so as to cause tail portions of said misaligned leading and following ones of said articles to swing toward one another until said articles are brought into said side-by-side position and thereby from an array of alternating head-to-tail oriented articles.

2. Apparatus for reorienting leading and following ones of frustroconically shaped articles comprising:

a conveyor for supporting said leading and following ones of said frustroconically shaped articles in a substantially parallel upright aligned position relative to a conveyance plane, and for transporting said leading and following ones in said aligned orientation in a conveyance direction along said conveyance plane;

a transfer assembly having a plurality of transfer heads each adapted to capture a head portion of said leading and following ones of said articles; and a controller operatively connected to said transfer assembly for (i) causing said transfer heads to contact and capture the head portions of said leading and following ones of said articles being transported by said conveyor, (ii) simultaneously removing said captured leading and following ones of said articles from said conveyor while in said aligned upright position, (iii) simultaneously laterally shifting said leading and following ones of said articles so that said leading and following ones of said articles are misaligned relative to one another and to said conveyance direction; and (iv) simultaneously oppositely pivoting said transfer heads so as to cause tail portions of said leading and following ones of said articles to swing toward one another and move said leading and following ones of said articles into a final position wherein said leading and following ones of said articles are situated in a substantially side-by-side planar orientation and thereby form an array of alternating head-to-tail oriented articles.

3. Apparatus as in claim 1 or 2, wherein said transfer assembly further comprises a moveable tray assembly for receiving said array of alternating head-to-tail oriented articles from said transfer assembly and for transferring said array of alternating head-to-tail oriented articles to another location.

4. Apparatus as in claim 3, further comprising a transfer conveyor positioned to receive said array of head-to-tail oriented articles at said another location and transport said array of head-to-tail oriented articles therefrom.

5. Apparatus as in claim 4, further comprising a secondary transfer assembly positioned relative to said transfer conveyor for removing said array of head-to-tail oriented articles as a unit from said transfer conveyor.

6. Apparatus as in claim 5, further comprising a packaging station having an empty package to receive said array of head-to-tail oriented articles removed from said transfer conveyor by said secondary transfer assembly.

7. A system for reorienting and transferring frozen dessert cones comprising:

a conveyor for supporting leading and following ones of said frozen dessert cones along a conveyance plane such that said leading and following ones of said cones are disposed substantial perpendicularly to said conveyance plane but in an aligned head-to-head orientation relative to a conveyance direction along said conveyance plane;

a transfer assembly having a plurality of transfer heads each adapted to capture a head portion of said leading and following ones of said frozen dessert cones; and a controller operatively connected to said transfer assembly for (i) causing said transfer heads to contact and capture the head portions of said leading and following ones of said frozen dessert cones being transported by said conveyor, (ii) removing said captured leading and following ones of said frozen dessert cones from said conveyor so that said leading and following ones of said frozen dessert cones are spaced above said conveyor, (iii) laterally shifting said leading and following ones of said frozen dessert cones relative to one another and to said conveyance direction so that said leading and following ones of said frozen dessert cones are misaligned in said conveyance direction; and (iv) simultaneously oppositely pivoting said transfer heads so as to cause tail portions of said leading and following ones of said frozen dessert cones to approach one another and thereby form an array of alternating head-to-tail oriented frozen dessert cones disposed in a plane which is spaced from, and substantially parallel to, said conveyance plane.

8. The system as in claim 7, wherein said transfer assembly further comprises a moveable tray assembly for receiving said array of alternating head-to-tail oriented frozen dessert cones from said transfer assembly and for transferring said array of alternating head-to-tail oriented frozen dessert cones to another location.

9. The system as in claim 8, further comprising a transfer conveyor positioned to receive said array of head-to-tail oriented frozen dessert cones at said another location and transport said array of head-to-tail oriented frozen dessert cones therefrom.

10. The system as in claim 9, further comprising a secondary transfer assembly positioned relative to said transfer conveyor for removing said array of head-to-tail oriented frozen dessert cones as a unit from said transfer conveyor.

11. The system as in claim 10, further comprising a packaging station having an empty package to receive said array of head-to-tail oriented frozen dessert cones removed from said transfer conveyor by said secondary transfer assembly.

12. A system for reorienting and transferring frozen dessert cones comprising:

a conveyor for transporting leading and following ones of said frozen dessert cones in an aligned upright orientation in a conveyance direction along a substantially horizontal conveyance plane;

a transfer assembly adapted to capture a head portion of said leading and following ones of said frozen dessert cones;

a transfer tray movable between a first position spaced from said transfer assembly and a second position for receiving an array of alternating head-to-tail oriented frozen dessert cones and transferring said array of alternating head-to-tail oriented frozen dessert cones to another location a controller operatively connected to said transfer assembly for causing said transfer assembly to (i) capture the head portions of said leading and following ones of said frozen dessert cones being transported by said conveyor, (ii) remove said captured leading and following ones of said frozen dessert cones from said conveyor so that said leading and following ones of said frozen dessert cones are spaced from said conveyance plane, (iii) simultaneously laterally shift said leading and following ones of said frozen dessert cones relative to one another and to said conveyance direction so that said leading and following ones of said frozen dessert cones are misaligned in said conveyance direction; and (iv) simultaneously oppositely pivot said leading and following ones of said frozen dessert cones so as to cause tail portions thereof to approach one another and thereby form a planar array of alternating head-to-tail oriented frozen dessert cones which is substantially parallel to, and vertically spaced above, said conveyance plane, wherein said controller moves said transfer tray from said first position and into said second position such that said transfer tray is positioned between said array of frozen dessert cones and said conveyance plane, and thereafter causes the transfer assembly to release the head portions of said array of head-to-tail oriented frozen dessert cones so that said array falls by gravity into said transfer tray therebelow.

13. The system as in claim 12, wherein said transfer assembly includes a plurality of transfer heads each adapted to capture a head portion of a respective frozen dessert cone.

14. The system as in claim 13, wherein said transfer heads include a suction cup adapted to be coupled to a vacuum source for pneumatically capturing said head portion of said respective frozen dessert cone.

15. The system as in claim 13, wherein said transfer heads include a finger element extendable into engagement with the head portion of said respective frozen dessert cone so as to mechanically capture the same.

16. The system as in claim 14 or 15, wherein said transfer heads include a rigid stabilization cup.

17. The system as in claim 12, further comprising:

a packaging station for packaging the array of head-to-tail oriented frozen dessert cones;

a transfer conveyor for transporting said array of head-to-tail oriented frozen dessert cones from said another location and to said packaging station; and a secondary transfer assembly for moving said array of head-to-tail oriented frozen dessert cones as a unit from said transfer conveyor and into an awaiting empty package at said packaging station.

18. The system of claim 17, wherein said secondary transfer assembly include a movable push plate for engaging said array of head-to-tail oriented frozen dessert cones and pushing the same as a unit laterally relative to said transfer conveyor and into said awaiting package.

19. The system as in claim 18, wherein said secondary transfer assembly includes an actuator coupled operatively to said push plate for moving said push plate between advanced and retracted positions relative to said array of head-to-tail oriented frozen dessert cones.

* * * * *